US012575698B2

(12) United States Patent
White et al.

(10) Patent No.: US 12,575,698 B2
(45) Date of Patent: Mar. 17, 2026

(54) MICRO PUREE MACHINE WITH SELECTABLE FOOD PROCESSING ROUTINES AND AUTOMATED MOTOR CONTROL

(71) Applicant: SharkNinja Operating LLC, Needham, MA (US)

(72) Inventors: Craig White, Salem, MA (US); Eric Holzer, Needham, MA (US)

(73) Assignee: SharkNinja Operating LLC, Needham, MA (US)

( * ) Notice: Subject to any disclaimer, the term of this patent is extended or adjusted under 35 U.S.C. 154(b) by 942 days.

(21) Appl. No.: 17/824,524

(22) Filed: May 25, 2022

(65) Prior Publication Data

US 2023/0010316 A1     Jan. 12, 2023

Related U.S. Application Data

(60) Provisional application No. 63/220,858, filed on Jul. 12, 2021.

(51) Int. Cl.
| | |
|---|---|
| *A47J 43/00* | (2006.01) |
| *A47J 43/044* | (2006.01) |
| *A47J 43/08* | (2006.01) |

(52) U.S. Cl.
CPC ........... *A47J 43/044* (2013.01); *A47J 43/082* (2013.01); *A47J 2043/04463* (2013.01)

(58) Field of Classification Search
CPC ................... A47J 43/082; A47J 43/044; A47J 2043/04463
See application file for complete search history.

(56) References Cited

U.S. PATENT DOCUMENTS

| | | | |
|---|---|---|---|
| 1,428,704 | A | 9/1922 | Petri |
| 1,579,355 | A | 4/1926 | Greenawalt |

(Continued)

FOREIGN PATENT DOCUMENTS

| | | |
|---|---|---|
| BE | 409469 | 6/1935 |
| CA | 3033891 | 2/2018 |

(Continued)

OTHER PUBLICATIONS

Rowzer Frozen Food Emulsifier, posted date unknown [online], [retrieved Sep. 5, 2023]. Retrieved from internet, https://prestigeproducts.com.au/rowzer -frozen-food-emulsifier/.

(Continued)

*Primary Examiner* — Anshu Bhatia
(74) *Attorney, Agent, or Firm* — The Webb Law Firm

(57) ABSTRACT

A micro puree machine including a drive motor coupled to a drive shaft via at least one gear. The drive motor is arranged to rotate a drive shaft and blade assembly. A position motor is operable to change a position of the drive shaft via rotation of the position. A user interface is arranged to: i) receive a user input to select a first routine associated with processing a first food type, and ii) display a status of the processing of the first food type while the first routine is running. A controller is arranged to: i) receive the user input selecting the first routine and retrieve the configuration data associated with the first routine, ii) control operations of the drive motor based on the configuration data associated with the first routine, and iii) control operations of the position motor based on the configuration data associated with the first routine.

20 Claims, 22 Drawing Sheets

(56)                References Cited

U.S. PATENT DOCUMENTS

| | | | |
|---|---|---|---|
| 1,583,591 | A | 5/1926 | Greenawalt |
| 1,781,321 | A | 11/1930 | Dehuff |
| 1,924,991 | A | 8/1933 | Harvie |
| 2,026,240 | A | 12/1935 | Luxmore |
| 2,157,683 | A | 5/1939 | Vollrath |
| 2,181,079 | A | 11/1939 | Dehuff |
| 2,251,903 | A | 8/1941 | Anstice et al. |
| 2,457,533 | A | 12/1948 | Dehuff |
| 2,472,188 | A | 6/1949 | Clark et al. |
| 2,565,226 | A | 8/1951 | Gross, Jr. |
| 2,609,189 | A | 9/1952 | Dering |
| 2,798,701 | A | 7/1957 | Collura |
| 2,811,339 | A | 10/1957 | Osborne |
| 3,505,075 | A | 4/1970 | Black |
| 4,173,925 | A | 11/1979 | Leon |
| 4,183,680 | A | 1/1980 | Manfroni |
| 4,547,076 | A | 10/1985 | Maurer |
| 4,601,583 | A | 7/1986 | Amorese |
| 4,637,221 | A | 1/1987 | Levine |
| 4,701,054 | A | 10/1987 | Cipelletti |
| 4,898,474 | A | 2/1990 | Lipson |
| 4,930,709 | A | 6/1990 | Steffens |
| 5,090,816 | A | 2/1992 | Socha |
| 5,383,726 | A | 1/1995 | Lanaro |
| 5,653,535 | A | 8/1997 | Xie et al. |
| 5,690,427 | A | 11/1997 | Jennings |
| 5,803,377 | A | 9/1998 | Farrell |
| 5,836,687 | A | 11/1998 | Khalid |
| 5,860,738 | A | 1/1999 | Brinkman |
| 5,908,242 | A | 6/1999 | St. John |
| 5,934,802 | A | 8/1999 | Xie |
| 6,190,121 | B1 | 2/2001 | Hayward |
| 6,213,007 | B1 | 4/2001 | Lande |
| 6,250,794 | B1 | 6/2001 | Huang |
| 6,298,668 | B1 | 10/2001 | Lo |
| 6,301,919 | B1 | 10/2001 | Blaustein et al. |
| 6,302,014 | B1 | 10/2001 | Kuan |
| 6,332,333 | B1 | 12/2001 | Lee |
| D454,023 | S | 3/2002 | Wang |
| 6,370,892 | B1 | 4/2002 | Ross |
| 6,389,962 | B1 | 5/2002 | Han et al. |
| 6,394,373 | B1 | 5/2002 | Morris |
| 6,438,987 | B1 | 8/2002 | Pahl |
| 6,474,862 | B2 | 11/2002 | Farrell |
| 6,494,610 | B1 | 12/2002 | Brunswick |
| 6,510,704 | B1 | 1/2003 | Russell |
| 6,510,890 | B1 | 1/2003 | Paskach et al. |
| 6,553,779 | B1 | 4/2003 | Boyer et al. |
| 6,599,007 | B2 | 7/2003 | Ryoo et al. |
| 6,651,849 | B2 | 11/2003 | Schroeder et al. |
| 6,698,228 | B2 | 3/2004 | Kateman et al. |
| 6,715,706 | B1 | 4/2004 | Planca |
| 6,730,348 | B2 | 5/2004 | Miller et al. |
| 6,735,967 | B1 | 5/2004 | Bischel et al. |
| 6,772,675 | B2 | 8/2004 | Ervin |
| 6,817,203 | B1 | 11/2004 | Rischewski |
| 6,817,749 | B2 | 11/2004 | Saunders et al. |
| 6,824,303 | B2 | 11/2004 | Huang |
| 6,848,356 | B1 | 2/2005 | Mueller |
| D502,841 | S | 3/2005 | Santer |
| 6,863,916 | B2 | 3/2005 | Henriksen et al. |
| 6,866,414 | B2 | 3/2005 | Kupidlowski |
| 6,892,554 | B2 | 5/2005 | Bonato et al. |
| 6,907,743 | B2 | 6/2005 | Cocchi et al. |
| 6,923,010 | B2 | 8/2005 | Small et al. |
| 6,945,067 | B2 | 9/2005 | Petersen |
| 6,966,691 | B2 | 11/2005 | Brunswick et al. |
| 6,991,363 | B2 | 1/2006 | Brunswick et al. |
| 7,014,354 | B2 | 3/2006 | Donthnier et al. |
| 7,017,783 | B1 | 3/2006 | Hunter et al. |
| 7,028,607 | B2 | 4/2006 | Zweben |
| 7,047,758 | B2 | 5/2006 | Ross |
| 7,048,217 | B2 | 5/2006 | Dickson, Jr. et al. |
| 7,081,265 | B2 | 7/2006 | Wanat |
| 7,266,952 | B2 | 9/2007 | Ross et al. |
| 7,275,386 | B2 | 10/2007 | Cigolini |
| 7,325,413 | B2 | 2/2008 | Ball |
| 7,384,187 | B2 | 6/2008 | Blackburn et al. |
| 7,395,751 | B2 | 7/2008 | Liu |
| 7,412,845 | B2 | 8/2008 | Boulos et al. |
| 7,448,516 | B2 | 11/2008 | Davis et al. |
| 7,451,613 | B2 | 11/2008 | Barraclough et al. |
| 7,455,868 | B2 | 11/2008 | Kennedy et al. |
| 7,572,472 | B2 | 8/2009 | Hermansen |
| 7,573,496 | B2 | 8/2009 | Okamura |
| 7,596,963 | B2 | 10/2009 | Rasmussen |
| 7,621,476 | B2 | 11/2009 | Jakobi et al. |
| 7,621,669 | B1 | 11/2009 | Gerber |
| 7,647,782 | B2 | 1/2010 | Bucceri |
| 7,665,398 | B2 | 2/2010 | Gerber |
| D612,195 | S | 3/2010 | Liu |
| 7,690,835 | B2 | 4/2010 | Schnipke et al. |
| 7,712,321 | B2 | 5/2010 | Kadyk |
| 7,861,890 | B2 | 1/2011 | Mcgill |
| 7,878,021 | B2 | 2/2011 | Perrier et al. |
| 7,896,038 | B2 | 3/2011 | Jones et al. |
| 7,950,843 | B2 | 5/2011 | Blackburn et al. |
| 7,997,788 | B2 | 8/2011 | Bell |
| 8,038,339 | B2 | 10/2011 | Jejcic |
| 8,109,113 | B2 | 2/2012 | Takata et al. |
| 8,177,418 | B2 | 5/2012 | Edwards et al. |
| 8,297,182 | B2 | 10/2012 | Cocchi et al. |
| 8,316,761 | B2 | 11/2012 | Bravo et al. |
| 8,322,274 | B2 | 12/2012 | Jejcic |
| D677,520 | S | 3/2013 | Choi et al. |
| D682,030 | S | 5/2013 | Ezechukwu |
| 8,479,531 | B2 | 7/2013 | Kazuya et al. |
| D700,013 | S | 2/2014 | Chu |
| 8,641,265 | B2 | 2/2014 | Bravo |
| D702,487 | S | 4/2014 | Gillette |
| 8,746,004 | B2 | 6/2014 | Jejcic |
| D708,902 | S | 7/2014 | Audette |
| 8,763,420 | B2 | 7/2014 | Eichler |
| 8,778,436 | B2 | 7/2014 | Waletzko et al. |
| 8,794,133 | B2 | 8/2014 | Fister et al. |
| 8,807,469 | B2 | 8/2014 | Sung |
| 8,807,823 | B2 | 8/2014 | Williams |
| 8,827,541 | B2 | 9/2014 | Bravo |
| 8,845,183 | B2 | 9/2014 | Kozlowski et al. |
| 8,857,197 | B1 | 10/2014 | Fisher et al. |
| 8,881,948 | B1 | 11/2014 | Lassota |
| 8,920,019 | B2 | 12/2014 | Kozlowski et al. |
| 8,944,289 | B2 | 2/2015 | Cocchi et al. |
| 9,004,608 | B1 | 4/2015 | Charbonneau |
| 9,016,926 | B2 | 4/2015 | Cocchi et al. |
| 9,138,698 | B2 | 9/2015 | Lilja |
| 9,149,156 | B2 | 10/2015 | Rosenzweig et al. |
| 9,155,322 | B2 | 10/2015 | Ricco et al. |
| 9,186,636 | B2 | 11/2015 | Dong et al. |
| D746,883 | S | 1/2016 | Strommer |
| 9,241,501 | B2 | 1/2016 | Broadbent et al. |
| 9,301,537 | B2 | 4/2016 | Cocchi et al. |
| 9,320,290 | B2 | 4/2016 | Cocchi et al. |
| D755,001 | S | 5/2016 | Lintner |
| 9,326,530 | B2 | 5/2016 | Ugolini |
| 9,326,531 | B1 | 5/2016 | Reich et al. |
| 9,339,049 | B2 | 5/2016 | Jejcic |
| 9,357,883 | B2 | 6/2016 | Lee et al. |
| 9,375,689 | B2 | 6/2016 | Bravo |
| D760,529 | S | 7/2016 | Hakansson |
| 9,393,533 | B2 | 7/2016 | Little et al. |
| 9,402,408 | B2 | 8/2016 | Cocchi et al. |
| 9,433,230 | B1 | 9/2016 | Fisher et al. |
| 9,579,615 | B2 | 2/2017 | Farrell |
| 9,591,865 | B2 | 3/2017 | Jayantilal et al. |
| 9,591,871 | B2 | 3/2017 | Ugolini |
| 9,635,874 | B2 | 5/2017 | Bruckner et al. |
| 9,763,462 | B2 | 9/2017 | He et al. |
| 9,816,748 | B2 | 11/2017 | Akan et al. |
| 9,833,109 | B2 | 12/2017 | Farrell et al. |
| 9,854,820 | B2 | 1/2018 | Cocchi et al. |
| 9,883,685 | B2 | 2/2018 | Bunker et al. |
| 9,918,484 | B2 | 3/2018 | Ekenhorst et al. |
| 9,968,113 | B2 | 5/2018 | Lazzarini et al. |

(56) References Cited

U.S. PATENT DOCUMENTS

| | | |
|---|---|---|
| 9,993,016 B1 | 6/2018 | Dyer |
| 10,004,250 B2 | 6/2018 | Ugolini |
| D823,036 S | 7/2018 | Kestenbaum |
| D823,628 S | 7/2018 | Steiner |
| 10,028,618 B1 | 7/2018 | Benson |
| 10,039,298 B2 | 8/2018 | Noth et al. |
| 10,111,447 B2 | 10/2018 | Noth et al. |
| 10,123,551 B2 | 11/2018 | Beth Halachmi |
| 10,123,553 B2 | 11/2018 | Cocchi et al. |
| 10,206,414 B2 | 2/2019 | Cocchi et al. |
| D846,332 S | 4/2019 | Gill et al. |
| 10,251,410 B2 | 4/2019 | Cocchi et al. |
| 10,285,417 B2 | 5/2019 | Cocchi et al. |
| 10,306,905 B2 | 6/2019 | Cocchi et al. |
| 10,321,700 B2 | 6/2019 | Cocchi et al. |
| 10,375,973 B2 | 8/2019 | Noth et al. |
| D858,194 S | 9/2019 | Kiser |
| 10,405,562 B2 | 9/2019 | Cocchi et al. |
| 10,443,917 B2 | 10/2019 | Kim |
| 10,463,059 B2 | 11/2019 | Bush |
| 10,477,879 B2 | 11/2019 | Cocchi et al. |
| 10,512,276 B2 | 12/2019 | Popov et al. |
| 10,542,766 B2 | 1/2020 | Cocchi et al. |
| 10,561,158 B2 | 2/2020 | Cocchi et al. |
| 10,568,336 B2 | 2/2020 | Choudhary et al. |
| 10,588,330 B2 | 3/2020 | Cocchi et al. |
| 10,602,755 B2 | 3/2020 | Cocchi et al. |
| 10,617,130 B2 | 4/2020 | Cocchi et al. |
| 10,617,131 B2 | 4/2020 | Lazzarini et al. |
| 10,624,363 B2 | 4/2020 | Rizvi et al. |
| 10,660,348 B2 | 5/2020 | Cheung |
| 10,660,349 B2 | 5/2020 | Cocchi et al. |
| 10,674,742 B2 | 6/2020 | Mansour |
| 10,674,743 B2 | 6/2020 | Ugolini |
| 10,674,744 B2 | 6/2020 | Cocchi et al. |
| 10,694,895 B2 | 6/2020 | Zakowski |
| D891,634 S | 7/2020 | Sakoon |
| 10,701,953 B2 | 7/2020 | Merlini |
| 10,712,094 B2 | 7/2020 | Cocchi et al. |
| 10,736,336 B2 | 8/2020 | Cocchi et al. |
| 10,743,561 B2 | 8/2020 | Smith |
| D894,659 S | 9/2020 | Kestenbaum |
| 10,785,992 B2 | 9/2020 | Newton et al. |
| D901,963 S | 11/2020 | Kestenbaum et al. |
| 10,874,132 B2 | 12/2020 | Nortey et al. |
| 10,905,134 B2 | 2/2021 | Cocchi et al. |
| 10,926,233 B2 | 2/2021 | Goodson |
| 10,945,447 B2 | 3/2021 | Cocchi et al. |
| 10,952,455 B2 | 3/2021 | Cocchi et al. |
| 10,952,456 B2 | 3/2021 | Cocchi et al. |
| 10,973,240 B1 | 4/2021 | Fonte |
| 10,993,458 B2 | 5/2021 | Cocchi et al. |
| 11,019,832 B2 | 6/2021 | Dong |
| 11,019,834 B2 | 6/2021 | Bruckner et al. |
| 11,021,319 B2 | 6/2021 | Fonte |
| 11,154,163 B1 | 10/2021 | He |
| 11,202,999 B1 | 12/2021 | Harrison, Jr. |
| 11,311,847 B2 | 4/2022 | Goldsmith |
| D950,292 S | 5/2022 | Finnance |
| 11,324,358 B1 | 5/2022 | O'Loughlin |
| 11,503,959 B2 | 11/2022 | Proulx et al. |
| 11,583,144 B1 | 2/2023 | Williams et al. |
| D983,603 S | 4/2023 | Shi et al. |
| 11,617,378 B2 | 4/2023 | Shi et al. |
| 11,617,474 B1 | 4/2023 | Williams et al. |
| D985,331 S | 5/2023 | He et al. |
| D1,004,368 S | 11/2023 | Shi et al. |
| D1,008,735 S | 12/2023 | Shi et al. |
| 2002/0093877 A1 | 7/2002 | Brunswick |
| 2003/0058734 A1 | 3/2003 | Poitras |
| 2003/0192325 A1 | 10/2003 | Cocchi et al. |
| 2004/0120213 A1 | 6/2004 | Short |
| 2005/0086814 A1 | 4/2005 | Huang |
| 2005/0141340 A1 | 6/2005 | Donthnier |
| 2005/0167537 A1 | 8/2005 | Chen |
| 2005/0170054 A1 | 8/2005 | Czark et al. |
| 2005/0183426 A1 | 8/2005 | Learned |
| 2005/0194484 A1 | 9/2005 | Starr |
| 2005/0207273 A1 | 9/2005 | Newman |
| 2005/0249032 A1 | 11/2005 | Heinhold et al. |
| 2006/0062078 A1 | 3/2006 | Jejcic |
| 2006/0158959 A1 | 7/2006 | Huang |
| 2006/0171248 A1 | 8/2006 | Chou |
| 2006/0243838 A1 | 11/2006 | Nakato |
| 2006/0263490 A1 | 11/2006 | Wall et al. |
| 2007/0095961 A1 | 5/2007 | Lin |
| 2007/0295750 A1 | 12/2007 | Cocchi et al. |
| 2007/0297282 A1 | 12/2007 | Procuranti |
| 2008/0087026 A1 | 4/2008 | Allin et al. |
| 2008/0219090 A1 | 9/2008 | Heinhold et al. |
| 2008/0223965 A1 | 9/2008 | Obersteiner |
| 2008/0257173 A1 | 10/2008 | Radi |
| 2008/0273419 A1 | 11/2008 | Cocchi et al. |
| 2008/0282723 A1 | 11/2008 | Perrier |
| 2009/0016150 A1 | 1/2009 | Mimran |
| 2009/0053375 A1 | 2/2009 | Johnson |
| 2009/0133429 A1 | 5/2009 | Petersen |
| 2009/0142466 A1 | 6/2009 | Robinson et al. |
| 2009/0186141 A1* | 7/2009 | Almblad .................. A23G 9/52 |
| | | 426/590 |
| 2009/0280214 A1 | 11/2009 | Kim et al. |
| 2011/0174654 A1 | 7/2011 | Krasznai |
| 2012/0080549 A1 | 4/2012 | Rukavina |
| 2012/0144676 A1 | 6/2012 | Davidian |
| 2012/0170404 A1 | 7/2012 | Drees et al. |
| 2012/0189746 A1 | 7/2012 | DeLong |
| 2013/0340456 A1 | 12/2013 | Hoare et al. |
| 2014/0007779 A1 | 1/2014 | Hoare et al. |
| 2014/0130538 A1 | 5/2014 | Bond et al. |
| 2014/0199448 A1 | 7/2014 | Shalev |
| 2014/0252146 A1 | 9/2014 | Audette et al. |
| 2014/0332612 A1 | 11/2014 | Liao et al. |
| 2015/0044344 A1 | 2/2015 | Choi |
| 2015/0097063 A1 | 4/2015 | Hsu |
| 2015/0174586 A1 | 6/2015 | Lipowski |
| 2015/0245637 A1 | 9/2015 | Bocchini |
| 2015/0257410 A1 | 9/2015 | Baragiola et al. |
| 2015/0272394 A1 | 10/2015 | Lin |
| 2015/0308062 A1 | 10/2015 | Charbonneau |
| 2015/0308063 A1 | 10/2015 | Charbonneau |
| 2015/0313414 A1 | 11/2015 | Gerard |
| 2015/0342413 A1 | 12/2015 | Joao et al. |
| 2016/0016133 A1 | 1/2016 | Merritt et al. |
| 2016/0045073 A1 | 2/2016 | Kozlowski et al. |
| 2016/0069604 A1 | 3/2016 | Oh |
| 2016/0158719 A1 | 6/2016 | Gushwa et al. |
| 2016/0270424 A1 | 9/2016 | Noth et al. |
| 2017/0042179 A1 | 2/2017 | Thomas |
| 2017/0112326 A1 | 4/2017 | Ochoa et al. |
| 2017/0188600 A1 | 7/2017 | Scharfman et al. |
| 2017/0209000 A1 | 7/2017 | Dickson, Jr. |
| 2017/0215456 A1 | 8/2017 | Noth et al. |
| 2017/0215647 A1 | 8/2017 | Zakowski |
| 2017/0332843 A1 | 11/2017 | Obersteiner |
| 2017/0360060 A1 | 12/2017 | De'longhi et al. |
| 2017/0367370 A1 | 12/2017 | Frisque et al. |
| 2018/0058742 A1 | 3/2018 | Kim |
| 2018/0064131 A1 | 3/2018 | Noth |
| 2018/0064132 A1 | 3/2018 | Noth |
| 2018/0084800 A1 | 3/2018 | Noth |
| 2018/0110238 A1 | 4/2018 | Aamer et al. |
| 2018/0132663 A1 | 5/2018 | Connell et al. |
| 2018/0213980 A1 | 8/2018 | Cody et al. |
| 2018/0263256 A1 | 9/2018 | De'Longhi et al. |
| 2019/0075815 A1 | 3/2019 | Cocchi et al. |
| 2019/0110496 A1 | 4/2019 | Cocchi et al. |
| 2019/0191718 A1* | 6/2019 | Kesig .................. B01F 35/6052 |
| 2019/0269148 A1 | 9/2019 | Ait bouziad et al. |
| 2019/0287102 A1 | 9/2019 | Cocchi et al. |
| 2019/0313855 A1 | 10/2019 | Ambrose |
| 2019/0335786 A1 | 11/2019 | Cocchi et al. |
| 2019/0337791 A1 | 11/2019 | Bush |
| 2019/0343145 A1 | 11/2019 | Cocchi et al. |
| 2019/0380358 A1 | 12/2019 | Cocchi et al. |

(56) References Cited

U.S. PATENT DOCUMENTS

| | | |
|---|---|---|
| 2019/0390879 A1 | 12/2019 | Cocchi et al. |
| 2020/0000120 A1 | 1/2020 | Cocchi et al. |
| 2020/0120951 A1 | 4/2020 | Wang |
| 2020/0178560 A1 | 6/2020 | Gerber et al. |
| 2020/0196626 A1 | 6/2020 | Cocchi et al. |
| 2020/0196627 A1 | 6/2020 | Cocchi et al. |
| 2020/0221726 A1 | 7/2020 | Cocchi et al. |
| 2020/0238236 A1 | 7/2020 | Branson, III |
| 2020/0245638 A1 | 8/2020 | Crema et al. |
| 2020/0253235 A1 | 8/2020 | Cocchi et al. |
| 2020/0315218 A1 | 10/2020 | Cocchi et al. |
| 2020/0352193 A1 | 11/2020 | Cocchi et al. |
| 2020/0397017 A1 | 12/2020 | Cocchi et al. |
| 2021/0000133 A1 | 1/2021 | Meldrum et al. |
| 2021/0000298 A1 | 1/2021 | Ambrose et al. |
| 2021/0022364 A1 | 1/2021 | Meldrum et al. |
| 2021/0022365 A1 | 1/2021 | Manz |
| 2021/0039609 A1 | 2/2021 | Wangler et al. |
| 2021/0106958 A1 | 4/2021 | Medici |
| 2021/0112825 A1 | 4/2021 | Bellomare et al. |
| 2021/0274974 A1 | 9/2021 | Abraham |
| 2021/0330129 A1 | 10/2021 | Swidler |
| 2021/0392918 A1 | 12/2021 | Anand |
| 2022/0030906 A1 | 2/2022 | Springer |
| 2022/0142409 A1 | 5/2022 | Beckstrom et al. |
| 2022/0202036 A1 | 6/2022 | Shi et al. |
| 2022/0225830 A1 | 7/2022 | Verbugge et al. |
| 2023/0010316 A1 | 1/2023 | White et al. |
| 2023/0067361 A1 | 3/2023 | Chan et al. |

FOREIGN PATENT DOCUMENTS

| | | |
|---|---|---|
| CH | 685321 | 6/1995 |
| CN | 87201657 | 2/1988 |
| CN | 1032121 | 4/1989 |
| CN | 2418689 | 2/2001 |
| CN | 2476962 | 2/2002 |
| CN | 2478364 | 2/2002 |
| CN | 2502525 | 7/2002 |
| CN | 2515961 | 10/2002 |
| CN | 2518335 | 10/2002 |
| CN | 2521914 | 11/2002 |
| CN | 2560215 | 7/2003 |
| CN | 2576011 | 10/2003 |
| CN | 2587189 | 11/2003 |
| CN | 2590387 | 12/2003 |
| CN | 2598358 | 1/2004 |
| CN | 2609355 | 4/2004 |
| CN | 2629440 | 8/2004 |
| CN | 2660908 | 12/2004 |
| CN | 2666176 | 12/2004 |
| CN | 2667901 | 1/2005 |
| CN | 2669617 | 1/2005 |
| CN | 1579194 | 2/2005 |
| CN | 2684699 | 3/2005 |
| CN | 2719037 | 8/2005 |
| CN | 2733910 | 10/2005 |
| CN | 2762561 | 3/2006 |
| CN | 2772248 | 4/2006 |
| CN | 1788597 | 6/2006 |
| CN | 2785380 | 6/2006 |
| CN | 2802990 | 8/2006 |
| CN | 2819134 | 9/2006 |
| CN | 1295977 | 1/2007 |
| CN | 2855096 | 1/2007 |
| CN | 1933910 | 3/2007 |
| CN | 2907262 | 6/2007 |
| CN | 2935824 | 8/2007 |
| CN | 100342794 | 10/2007 |
| CN | 200959807 | 10/2007 |
| CN | 201004979 | 1/2008 |
| CN | 201015400 | 2/2008 |
| CN | 201015402 | 2/2008 |
| CN | 101138379 | 3/2008 |
| CN | 201156957 | 12/2008 |
| CN | 201174951 | 1/2009 |
| CN | 101574112 | 11/2009 |
| CN | 201345883 | 11/2009 |
| CN | 101605464 | 12/2009 |
| CN | 201352936 | 12/2009 |
| CN | 201352937 | 12/2009 |
| CN | 201388483 | 1/2010 |
| CN | 201388484 | 1/2010 |
| CN | 201393518 | 2/2010 |
| CN | 201404045 | 2/2010 |
| CN | 201414376 | 3/2010 |
| CN | 101744084 | 6/2010 |
| CN | 201523634 | 7/2010 |
| CN | 101810239 | 8/2010 |
| CN | 201557512 | 8/2010 |
| CN | 101861907 | 10/2010 |
| CN | 101889623 | 11/2010 |
| CN | 201726817 | 2/2011 |
| CN | 102048015 | 5/2011 |
| CN | 201839768 | 5/2011 |
| CN | 102078149 | 6/2011 |
| CN | 201888213 | 7/2011 |
| CN | 201905193 | 7/2011 |
| CN | 102138620 | 8/2011 |
| CN | 102144705 | 8/2011 |
| CN | 102160593 | 8/2011 |
| CN | 201919605 | 8/2011 |
| CN | 201928933 | 8/2011 |
| CN | 201986636 | 9/2011 |
| CN | 201987368 | 9/2011 |
| CN | 201995529 | 10/2011 |
| CN | 202050862 | 11/2011 |
| CN | 202112243 | 1/2012 |
| CN | 202172781 | 3/2012 |
| CN | 102605735 | 7/2012 |
| CN | 102655794 | 9/2012 |
| CN | 202406999 | 9/2012 |
| CN | 202408593 | 9/2012 |
| CN | 202436050 | 9/2012 |
| CN | 202456290 | 10/2012 |
| CN | 102805194 | 12/2012 |
| CN | 202635510 | 1/2013 |
| CN | 202697631 | 1/2013 |
| CN | 202722421 | 2/2013 |
| CN | 202722422 | 2/2013 |
| CN | 102987048 | 3/2013 |
| CN | 202773992 | 3/2013 |
| CN | 202819518 | 3/2013 |
| CN | 202890392 | 4/2013 |
| CN | 103082077 | 5/2013 |
| CN | 202931999 | 5/2013 |
| CN | 103168908 | 6/2013 |
| CN | 202958664 | 6/2013 |
| CN | 103190520 | 7/2013 |
| CN | 103211076 | 7/2013 |
| CN | 203058219 | 7/2013 |
| CN | 203087447 | 7/2013 |
| CN | 103262936 | 8/2013 |
| CN | 203105529 | 8/2013 |
| CN | 203152409 | 8/2013 |
| CN | 203152410 | 8/2013 |
| CN | 203174549 | 9/2013 |
| CN | 203207110 | 9/2013 |
| CN | 203233980 | 10/2013 |
| CN | 103380848 | 11/2013 |
| CN | 103404686 | 11/2013 |
| CN | 203262198 | 11/2013 |
| CN | 203279785 | 11/2013 |
| CN | 203279787 | 11/2013 |
| CN | 203290182 | 11/2013 |
| CN | 103478391 | 1/2014 |
| CN | 103480470 | 1/2014 |
| CN | 203407469 | 1/2014 |
| CN | 203467595 | 3/2014 |
| CN | 203534013 | 4/2014 |
| CN | 203563639 | 4/2014 |
| CN | 203590909 | 5/2014 |
| CN | 203597340 | 5/2014 |
| CN | 203608787 | 5/2014 |

(56)     References Cited

FOREIGN PATENT DOCUMENTS

| | | |
|---|---|---|
| CN | 203661940 | 6/2014 |
| CN | 203725214 | 7/2014 |
| CN | 203744631 | 7/2014 |
| CN | 203748570 | 8/2014 |
| CN | 203748571 | 8/2014 |
| CN | 203748572 | 8/2014 |
| CN | 203748573 | 8/2014 |
| CN | 203748574 | 8/2014 |
| CN | 203801633 | 9/2014 |
| CN | 203827994 | 9/2014 |
| CN | 104115987 | 10/2014 |
| CN | 203897199 | 10/2014 |
| CN | 203985911 | 12/2014 |
| CN | 104279828 | 1/2015 |
| CN | 204090940 | 1/2015 |
| CN | 204120763 | 1/2015 |
| CN | 204146242 | 2/2015 |
| CN | 204191506 | 3/2015 |
| CN | 204202291 | 3/2015 |
| CN | 204217795 | 3/2015 |
| CN | 204259745 | 4/2015 |
| CN | 204273127 | 4/2015 |
| CN | 104621328 | 5/2015 |
| CN | 204362865 | 6/2015 |
| CN | 204362866 | 6/2015 |
| CN | 104782875 | 7/2015 |
| CN | 204426583 | 7/2015 |
| CN | 204444075 | 7/2015 |
| CN | 204482918 | 7/2015 |
| CN | 104824327 | 8/2015 |
| CN | 204520414 | 8/2015 |
| CN | 204599206 | 9/2015 |
| CN | 204599207 | 9/2015 |
| CN | 204599208 | 9/2015 |
| CN | 204616962 | 9/2015 |
| CN | 104982632 | 10/2015 |
| CN | 204707918 | 10/2015 |
| CN | 105010708 | 11/2015 |
| CN | 105076654 | 11/2015 |
| CN | 204742478 | 11/2015 |
| CN | 204742479 | 11/2015 |
| CN | 204742480 | 11/2015 |
| CN | 204811833 | 12/2015 |
| CN | 204830618 | 12/2015 |
| CN | 204837840 | 12/2015 |
| CN | 204860999 | 12/2015 |
| CN | 204907789 | 12/2015 |
| CN | 105214552 | 1/2016 |
| CN | 204930249 | 1/2016 |
| CN | 204949372 | 1/2016 |
| CN | 204949373 | 1/2016 |
| CN | 205093510 | 3/2016 |
| CN | 105498590 | 4/2016 |
| CN | 205161783 | 4/2016 |
| CN | 205161784 | 4/2016 |
| CN | 205180269 | 4/2016 |
| CN | 105558248 | 5/2016 |
| CN | 105685363 | 6/2016 |
| CN | 205308187 | 6/2016 |
| CN | 205337470 | 6/2016 |
| CN | 105758080 | 7/2016 |
| CN | 105767442 | 7/2016 |
| CN | 205358065 | 7/2016 |
| CN | 105815531 | 8/2016 |
| CN | 105841416 | 8/2016 |
| CN | 105851451 | 8/2016 |
| CN | 205409472 | 8/2016 |
| CN | 205431914 | 8/2016 |
| CN | 205455812 | 8/2016 |
| CN | 205505529 | 8/2016 |
| CN | 205505530 | 8/2016 |
| CN | 105953513 | 9/2016 |
| CN | 105953515 | 9/2016 |
| CN | 105961818 | 9/2016 |
| CN | 205567686 | 9/2016 |
| CN | 205580055 | 9/2016 |
| CN | 205585245 | 9/2016 |
| CN | 106035973 | 10/2016 |
| CN | 205624265 | 10/2016 |
| CN | 205624266 | 10/2016 |
| CN | 205655544 | 10/2016 |
| CN | 205695438 | 11/2016 |
| CN | 205695441 | 11/2016 |
| CN | 205695442 | 11/2016 |
| CN | 205747670 | 11/2016 |
| CN | 106221174 | 12/2016 |
| CN | 205848606 | 1/2017 |
| CN | 106376706 | 2/2017 |
| CN | 205939910 | 2/2017 |
| CN | 205947042 | 2/2017 |
| CN | 205947054 | 2/2017 |
| CN | 206005817 | 3/2017 |
| CN | 106693746 | 5/2017 |
| CN | 206182263 | 5/2017 |
| CN | 206196872 | 5/2017 |
| CN | 206196873 | 5/2017 |
| CN | 106889294 | 6/2017 |
| CN | 206213187 | 6/2017 |
| CN | 206227572 | 6/2017 |
| CN | 206227573 | 6/2017 |
| CN | 206227575 | 6/2017 |
| CN | 106979634 | 7/2017 |
| CN | 106982977 | 7/2017 |
| CN | 206354338 | 7/2017 |
| CN | 107019088 | 8/2017 |
| CN | 107027950 | 8/2017 |
| CN | 206413692 | 8/2017 |
| CN | 206443073 | 8/2017 |
| CN | 107125423 | 9/2017 |
| CN | 107175713 | 9/2017 |
| CN | 206525481 | 9/2017 |
| CN | 206547792 | 10/2017 |
| CN | 206576207 | 10/2017 |
| CN | 206620790 | 11/2017 |
| CN | 206739675 | 12/2017 |
| CN | 206761571 | 12/2017 |
| CN | 206761572 | 12/2017 |
| CN | 206761573 | 12/2017 |
| CN | 206761574 | 12/2017 |
| CN | 107616292 | 1/2018 |
| CN | 206821892 | 1/2018 |
| CN | 206821897 | 1/2018 |
| CN | 207023136 | 2/2018 |
| CN | 207023137 | 2/2018 |
| CN | 207201937 | 4/2018 |
| CN | 207220039 | 4/2018 |
| CN | 207269785 | 5/2018 |
| CN | 207285067 | 5/2018 |
| CN | 304636869 | 5/2018 |
| CN | 108271912 | 7/2018 |
| CN | 207590022 | 7/2018 |
| CN | 207653496 | 7/2018 |
| CN | 207716705 | 8/2018 |
| CN | 207721134 | 8/2018 |
| CN | 108514044 | 9/2018 |
| CN | 207836682 | 9/2018 |
| CN | 207940303 | 10/2018 |
| CN | 108813086 | 11/2018 |
| CN | 108813087 | 11/2018 |
| CN | 108991950 | 12/2018 |
| CN | 208228236 | 12/2018 |
| CN | 109123054 | 1/2019 |
| CN | 109152384 | 1/2019 |
| CN | 109156596 | 1/2019 |
| CN | 109195695 | 1/2019 |
| CN | 208425451 | 1/2019 |
| CN | 208434646 | 1/2019 |
| CN | 208523680 | 2/2019 |
| CN | 109431269 | 3/2019 |
| CN | 109864173 | 6/2019 |
| CN | 209031071 | 6/2019 |
| CN | 109997949 | 7/2019 |
| CN | 209047390 | 7/2019 |
| CN | 209073407 | 7/2019 |

(56) References Cited

FOREIGN PATENT DOCUMENTS

| CN | 209147536 | 7/2019 |
| CN | 209171337 | 7/2019 |
| CN | 209171342 | 7/2019 |
| CN | 209251633 | 8/2019 |
| CN | 209284210 | 8/2019 |
| CN | 209436192 | 9/2019 |
| CN | 209489434 | 10/2019 |
| CN | 110477182 | 11/2019 |
| CN | 209825085 | 12/2019 |
| CN | 110651883 | 1/2020 |
| CN | 209965158 | 1/2020 |
| CN | 110771717 | 2/2020 |
| CN | 110810615 | 2/2020 |
| CN | 210054494 | 2/2020 |
| CN | 210157942 | 3/2020 |
| CN | 210168943 | 3/2020 |
| CN | 210203192 | 3/2020 |
| CN | 210299346 | 4/2020 |
| CN | 210332513 | 4/2020 |
| CN | 305740361 | 4/2020 |
| CN | 210610902 | 5/2020 |
| CN | 210625031 | 5/2020 |
| CN | 111328909 | 6/2020 |
| CN | 210695798 | 6/2020 |
| CN | 210747048 | 6/2020 |
| CN | 210901236 | 7/2020 |
| CN | 210901239 | 7/2020 |
| CN | 211026023 | 7/2020 |
| CN | 211091708 | 7/2020 |
| CN | 211091709 | 7/2020 |
| CN | 211211296 | 8/2020 |
| CN | 111657388 | 9/2020 |
| CN | 111657389 | 9/2020 |
| CN | 211430928 | 9/2020 |
| CN | 211739597 | 10/2020 |
| CN | 211746663 | 10/2020 |
| CN | 211794135 | 10/2020 |
| CN | 111887338 | 11/2020 |
| CN | 111903828 | 11/2020 |
| CN | 112041094 | 12/2020 |
| CN | 212232975 | 12/2020 |
| CN | 212232976 | 12/2020 |
| CN | 112219932 | 1/2021 |
| CN | 212306694 | 1/2021 |
| CN | 212325314 | 1/2021 |
| CN | 212345191 | 1/2021 |
| CN | 212414601 | 1/2021 |
| CN | 112312806 | 2/2021 |
| CN | 212437169 | 2/2021 |
| CN | 212464764 | 2/2021 |
| CN | 112515503 | 3/2021 |
| CN | 112715735 | 4/2021 |
| CN | 212852474 | 4/2021 |
| CN | 213045050 | 4/2021 |
| CN | 213074319 | 4/2021 |
| CN | 213454405 | 6/2021 |
| CN | 213793253 | 7/2021 |
| CN | 214250243 | 9/2021 |
| CN | 215638179 | 1/2022 |
| DE | 2905308 | 9/1979 |
| DE | 102004008748 | 9/2004 |
| DE | 102018119811 | 6/2019 |
| EM | 009100167-0001 | 7/2022 |
| EP | 0161679 | 11/1985 |
| EP | 0308666 | 3/1989 |
| EP | 0891139 | 1/1999 |
| EP | 1068803 | 1/2001 |
| EP | 0877558 | 7/2002 |
| EP | 1264567 | 12/2002 |
| EP | 1334664 | 8/2003 |
| EP | 0996341 | 9/2003 |
| EP | 1449441 | 8/2004 |
| EP | 1156735 | 10/2004 |
| EP | 1544882 | 6/2005 |
| EP | 1588981 | 10/2005 |
| EP | 1309245 | 3/2006 |
| EP | 1465499 | 3/2006 |
| EP | 1680228 | 7/2006 |
| EP | 1884167 | 2/2008 |
| EP | 1802225 | 4/2009 |
| EP | 2050343 | 4/2009 |
| EP | 2067407 | 6/2009 |
| EP | 2070423 | 6/2009 |
| EP | 2140768 | 1/2010 |
| EP | 2189067 | 5/2010 |
| EP | 2277386 | 1/2011 |
| EP | 2284465 | 2/2011 |
| EP | 2335535 | 6/2011 |
| EP | 2402690 | 1/2012 |
| EP | 2478774 | 7/2012 |
| EP | 2512312 | 10/2012 |
| EP | 2524603 | 11/2012 |
| EP | 2545832 | 1/2013 |
| EP | 1993373 | 6/2013 |
| EP | 2659958 | 11/2013 |
| EP | 2708141 | 3/2014 |
| EP | 2242376 | 6/2014 |
| EP | 2750517 | 7/2014 |
| EP | 2805620 | 11/2014 |
| EP | 2560502 | 12/2014 |
| EP | 2820987 | 1/2015 |
| EP | 2242377 | 2/2015 |
| EP | 2862450 | 4/2015 |
| EP | 2862488 | 4/2015 |
| EP | 2611344 | 7/2015 |
| EP | 2681009 | 8/2015 |
| EP | 2755496 | 8/2015 |
| EP | 2673581 | 9/2015 |
| EP | 3008410 | 4/2016 |
| EP | 3058831 | 8/2016 |
| EP | 2897469 | 11/2016 |
| EP | 3095332 | 11/2016 |
| EP | 2445356 | 4/2017 |
| EP | 3148347 | 4/2017 |
| EP | 3158872 | 4/2017 |
| EP | 3050616 | 11/2017 |
| EP | 3247216 | 11/2017 |
| EP | 2916695 | 1/2018 |
| EP | 3266311 | 1/2018 |
| EP | 3292768 | 3/2018 |
| EP | 3305089 | 4/2018 |
| EP | 3351113 | 7/2018 |
| EP | 2755497 | 9/2018 |
| EP | 3369353 | 9/2018 |
| EP | 3381295 | 10/2018 |
| EP | 3391752 | 10/2018 |
| EP | 3145320 | 12/2018 |
| EP | 3220749 | 12/2018 |
| EP | 3426055 | 1/2019 |
| EP | 3473950 | 4/2019 |
| EP | 3331375 | 6/2019 |
| EP | 3021956 | 8/2019 |
| EP | 3568025 | 11/2019 |
| EP | 3590351 | 1/2020 |
| EP | 3183975 | 4/2020 |
| EP | 3185693 | 4/2020 |
| EP | 3632473 | 4/2020 |
| EP | 3643180 | 4/2020 |
| EP | 3091848 | 7/2020 |
| EP | 3682743 | 7/2020 |
| EP | 3490386 | 8/2020 |
| EP | 3528639 | 12/2020 |
| EP | 3758503 | 1/2021 |
| EP | 3291719 | 3/2021 |
| EP | 3787808 | 3/2021 |
| EP | 3796784 | 3/2021 |
| EP | 3801042 | 4/2021 |
| EP | 3801158 | 4/2021 |
| EP | 3775729 | 9/2022 |
| ES | 1071424 | 2/2010 |
| ES | 1071426 | 2/2010 |
| FR | 1104425 | 11/1955 |
| GB | 6221941 | 7/2022 |
| JP | S5931654 | 2/1984 |

(56) References Cited

FOREIGN PATENT DOCUMENTS

| | | |
|---|---|---|
| KR | 20040099008 | 11/2004 |
| KR | 2020130004981 | 8/2013 |
| KR | 101624283 | 5/2016 |
| KR | 20170056787 | 5/2017 |
| KR | 102185180 | 12/2020 |
| TW | M429850 | 5/2012 |
| TW | I465677 | 12/2014 |
| TW | I535986 | 6/2016 |
| WO | WO1997036498 | 10/1997 |
| WO | 2001097628 | 12/2001 |
| WO | 2003065819 | 8/2003 |
| WO | WO2005072879 | 8/2005 |
| WO | WO2008036972 | 3/2008 |
| WO | WO2011073873 | 6/2011 |
| WO | WO2011113970 | 9/2011 |
| WO | 2013030033 | 3/2013 |
| WO | 2014026445 | 2/2014 |
| WO | 2014198558 | 12/2014 |
| WO | 2014206119 | 12/2014 |
| WO | 2015063135 | 5/2015 |
| WO | 2015185094 | 12/2015 |
| WO | 2016078042 | 5/2016 |
| WO | WO2017090647 | 6/2017 |
| WO | 2017139395 | 8/2017 |
| WO | 2017153512 | 9/2017 |
| WO | 2017166007 | 10/2017 |
| WO | WO2017166008 | 10/2017 |
| WO | WO2018007833 | 1/2018 |
| WO | WO2018085369 | 5/2018 |
| WO | 2018130986 | 7/2018 |
| WO | 2018141758 | 8/2018 |
| WO | WO2018223555 | 12/2018 |
| WO | 2019167098 | 9/2019 |
| WO | 2019197152 | 10/2019 |
| WO | WO2019200490 | 10/2019 |
| WO | WO2019200491 | 10/2019 |
| WO | 2019224856 | 11/2019 |
| WO | 2019224858 | 11/2019 |
| WO | 2019224859 | 11/2019 |
| WO | WO2019210934 | 11/2019 |
| WO | WO2019220491 | 11/2019 |
| WO | 2020236173 | 11/2020 |
| WO | WO2022014808 | 1/2022 |
| WO | WO2022020653 | 1/2022 |

OTHER PUBLICATIONS

Ninja Store NC301 CREAMi, posted Aug. 17, 2021 [online], [retrieved Sep. 5, 2023]. Retrieved from internet, https://www.amazon.com/Ninja-NC301-placeholder-Cream-Maker/dp/B08QXB9BH5/ (Year: 2021).

Ninja NC501 CREAMi Deluxe, posted Sep. 23, 2022 [online], [retrieved Sep. 5, 2023]. Retrieved from internet, https://www.amazon.com/Ninja-NC501-Milkshakes-Programs-Containers/dp/B0B9CZ6XBQ (Year: 2022).

Ninja Creami Deluxe, posted Sep. 23, 2022 [online], [retrieved Oct. 19, 2023]. Retrieved from internet, https://www.amazon.com/Ninja-NC501-Milkshakes-Programs-Containers/dp/BOB9CZ6XBQ/ (Year: 2022).

Ninja Creami, posted Apr. 19, 2022 [online], [retrieved Oct. 19, 2023]. Retrieved from internet, https://www.amazon.com/Ninja-NC299AMZ-Milkshakes-One-Touch-Container/dp/B09QV24FFZ/ (Year: 2022).

"Ninja NC301 CREAMi Ice Cream Maker," retrieved from URL: https://www.amazon.com/Ninja-NC301-placeholder-Cream-Maker/dp/B08QXB9BH5/ref=sr_1_1?keywords=ninja%2Bicecream%2Bmaker%2Bmachin&qid=1663587903&sr=8-1&th=1, 9 pgs. (Pub: Aug. 17, 2021).

Ice Cream Maker, Ninja™ CREAMi™: How to Assemble + Use, YouTube video by Ninja Kitchen; retrieved from URL: https://www.youtube.com/watch?v=fXkq1tzxLm0, (Jul. 27, 2021).

CRAN DOI Spare Blade. Date First Available on Amazon.com Sep. 17, 2021. https://www.amazon.com/dp/B09GK8KRN F/ref (Year: 2021), 1 page.

International Preliminary Report on Patentability in Application No. PCT/US2022/031270 dated Jan. 25, 2024, 8 pages.

* cited by examiner

SECTION A—A

SECTION B-B

SECTION C-C

NC500 P2 (1.5 PINT)

LOGIC FOR BLADE DIAMETER OF 95mm

FULL

| PROGRAM | DECENT BLADE SPEED (rpm) | DECENT TIME (s) | HOLD AT BOTTOM SPEED (rpm) | HOLD AT BOTTOM TIME (s) | RETRACTION BLADE SPEED (rpm) | RETRACTION TIME (s) | HOLD AT TOP SPEED (rpm) | HOLD AT TOP TIME (s) |
|---|---|---|---|---|---|---|---|---|
| 1 ICE CREAM | 1200 | 75 | 450 | 3 | 450 | 38 | 450 | 5 |
| 2 LITE ICE CREAM | 1800 | 150 | 1800 | 3 | 1800 | 38 | 1800 | 5 |
| 3 SORBET | 1800 | 150 | 450 | 3 | 450 | 38 | 450 | 5 |
| 4 GELATO | 1200 | 75 | 450 | 3 | 450 | 38 | 450 | 5 |
| 5 FROZEN YOGURT | 1800 | 150 | 1800 | 3 | 1800 | 150 | 1800 | 5 |
| 6 ICE FUSION | 1800 | 150 | 1800 | 3 | 1800 | 150 | 1800 | 5 |
| 7 ICE FROST | 1800 | 150 | 1800 | 3 | 1800 | 150 | 1800 | 5 |
| 8 ITALIAN ICE | 1800 | 150 | 1800 | 3 | 1800 | 150 | 1800 | 5 |
| 9 MILKSHAKE | 1800 | 75 | 450 | 3 | 450 | 38 | 450 | 5 |
| 10 CREAMICCINO | 1800 | 150 | 1800 | 3 | 1800 | 150 | 1800 | 5 |
| 11 RE-SPIN | 1200 | 38 | 1200 | 3 | 1200 | 38 | 1200 | 5 |
| 12 MIX-IN | 450 | 38 | 450 | 3 | 450 | 38 | 450 | 5 |

1400
1402
1404
1408
1410

DISPLAY LOGIC :
"EXACT TIMES VARY BASED ON FEEDBACK OF RECIPE. BASELINE TIMES BELOW

1406

| TOTAL PROGRAM TIME (s) | 0 - 20% DISPLAY "5" TIME PERIOD (s) | 20 - 40% DISPLAY "4" TIME PERIOD (s) | 40 - 60% DISPLAY "3" TIME PERIOD (s) | 60 - 80% DISPLAY "2" TIME PERIOD (s) | 80 - 100% DISPLAY "1" TIME PERIOD (s) | 100% DISPLAY "0" TIME PERIOD (s) |
|---|---|---|---|---|---|---|
| 121 | | | | 60 | 61 | 5 |
| 196 | | 16 | | 60 | 60 | 5 |
| 196 | | 16 | 60 | 60 | 60 | 5 |
| 121 | | | 60 | 60 | 61 | 5 |
| 309 | 62 | 62 | 62 | 62 | 61 | 5 |
| 309 | 62 | 62 | 62 | 62 | 61 | 5 |
| 309 | 62 | 62 | 62 | 62 | 61 | 5 |
| 309 | 62 | 62 | 62 | 60 | 61 | 5 |
| 121 | | | | 62 | 61 | 5 |
| 309 | 62 | 62 | 62 | 62 | 61 | 5 |
| 83 | | | | 23 | 60 | 5 |
| 83 | | | | 23 | 60 | 5 |

FULL

FROM FIG. 14 CONT.

| | PROGRAM | DECENT BLADE SPEED (rpm) | DECENT TIME (s) | HOLD AT BOTTOM SPEED (rpm) | HOLD AT BOTTOM TIME (s) | RETRACTION BLADE SPEED (rpm) | RETRACTION TIME (s) | HOLD AT TOP SPEED (rpm) | HOLD AT TOP TIME (s) |
|---|---|---|---|---|---|---|---|---|---|
| | | | | TOP (FOLLOW UI FLOW FOR MORE DETAILS) | | | | | |
| 1 | ICE CREAM | 1200 | 38 | 450 | 3 | 450 | 19 | 450 | 5 |
| 2 | LITE ICE CREAM | 1800 | 75 | 1800 | 3 | 1800 | 19 | 1800 | 5 |
| 3 | SORBET | 1800 | 75 | 450 | 3 | 450 | 19 | 450 | 5 |
| 4 | GELATO | 1200 | 38 | 450 | 3 | 450 | 19 | 450 | 5 |
| 5 | FROZEN YOGURT | 1800 | 75 | 1800 | 3 | 1800 | 75 | 1800 | 5 |
| 11 | RE-SPIN | 1200 | 19 | 1200 | 3 | 1200 | 19 | 1200 | 5 |
| 12 | MIX-IN | 450 | 19 | 450 | 3 | 450 | 19 | 450 | 5 |

*FIG. 15*

| TOTAL PROGRAM TIME (s) | DISPLAY "5" TIME PERIOD (s) | DISPLAY "4" TIME PERIOD (s) | DISPLAY "3" TIME PERIOD (s) | DISPLAY "2" TIME PERIOD (s) | DISPLAY "1" TIME PERIOD (s) | DISPLAY "0" TIME PERIOD (s) |
|---|---|---|---|---|---|---|
| | | | TOP (FOLLOW UI FLOW FOR MORE DETAILS) | | | |
| 64 | | | | | 64 | 5 |
| 102 | | | | 42 | 60 | 5 |
| 102 | | | | 42 | 60 | 5 |
| 64 | | | | | 64 | 5 |
| 158 | | | 38 | 60 | 60 | 5 |
| 46 | | | | | 46 | 5 |
| 46 | | | | | 46 | 5 |

1506

FROM

Figure 16:
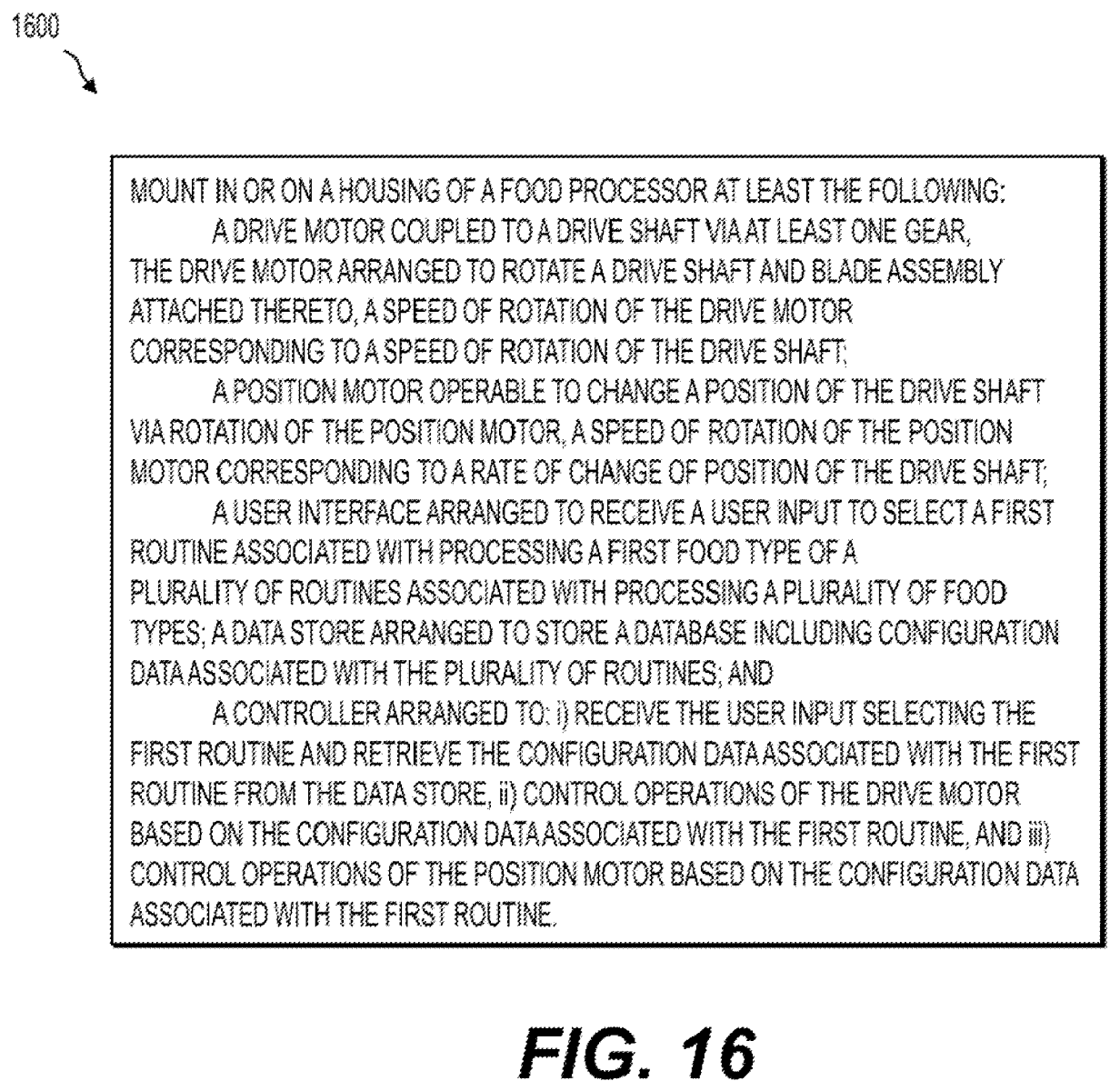

MOUNT IN OR ON A HOUSING OF A FOOD PROCESSOR AT LEAST THE FOLLOWING:

A DRIVE MOTOR COUPLED TO A DRIVE SHAFT VIA AT LEAST ONE GEAR, THE DRIVE MOTOR ARRANGED TO ROTATE A DRIVE SHAFT AND BLADE ASSEMBLY ATTACHED THERETO, A SPEED OF ROTATION OF THE DRIVE MOTOR CORRESPONDING TO A SPEED OF ROTATION OF THE DRIVE SHAFT;

A POSITION MOTOR OPERABLE TO CHANGE A POSITION OF THE DRIVE SHAFT VIA ROTATION OF THE POSITION MOTOR, A SPEED OF ROTATION OF THE POSITION MOTOR CORRESPONDING TO A RATE OF CHANGE OF POSITION OF THE DRIVE SHAFT;

A USER INTERFACE ARRANGED TO RECEIVE A USER INPUT TO SELECT A FIRST ROUTINE ASSOCIATED WITH PROCESSING A FIRST FOOD TYPE OF A PLURALITY OF ROUTINES ASSOCIATED WITH PROCESSING A PLURALITY OF FOOD TYPES; A DATA STORE ARRANGED TO STORE A DATABASE INCLUDING CONFIGURATION DATA ASSOCIATED WITH THE PLURALITY OF ROUTINES; AND

A CONTROLLER ARRANGED TO: i) RECEIVE THE USER INPUT SELECTING THE FIRST ROUTINE AND RETRIEVE THE CONFIGURATION DATA ASSOCIATED WITH THE FIRST ROUTINE FROM THE DATA STORE, ii) CONTROL OPERATIONS OF THE DRIVE MOTOR BASED ON THE CONFIGURATION DATA ASSOCIATED WITH THE FIRST ROUTINE, AND iii) CONTROL OPERATIONS OF THE POSITION MOTOR BASED ON THE CONFIGURATION DATA ASSOCIATED WITH THE FIRST ROUTINE.

MICRO PUREE MACHINE WITH SELECTABLE FOOD PROCESSING ROUTINES AND AUTOMATED MOTOR CONTROL

REFERENCE TO RELATED APPLICATIONS

This application claims priority to and the benefit of U.S. Provisional Patent Application No. 63/220,858, filed on Jul. 12, 2021, entitled "MICRO PUREE MACHINE WITH PROGRAMMABLE MOTOR," the entire content of which are incorporated herein by reference.

FIELD

The present disclosure relates to a kitchen tool and food processor device, and more particularly, to automated motor control of a device and system for micro pureeing ingredients to make foods and drinks.

BACKGROUND

Machines for making ice creams, gelatos, frozen yogurts, sorbets and the like are known in the art. Typically, a user adds a series of non-frozen ingredients to a bowl. The ingredients are then churned by a paddle while a refrigeration mechanism simultaneously freezes the ingredients. These devices have known shortcomings, including the amount of time and effort required by the user to complete the ice cream making process. Machines of this nature are also impractical for preparing most non-dessert food products.

An alternative type of machine for making a frozen food product is a micro-puree machine. Typically, machines of this nature spin and plunge a blade into a pre-frozen ingredient or combination of ingredients. While useful for making frozen desserts like ice creams, gelatos, frozen yogurts, sorbets and the like, micro-puree style machines can also prepare non-dessert types of foods such as non-dessert purees and mousses. In addition, the devices can prepare either an entire batch of ingredients to be served or a pre-desired number of servings. Known machines of this nature are generally commercial-grade and therefore exceedingly large and heavy. They usually require complex systems that are difficult to maintain and are typically too expensive, cumbersome and/or impractical for home use by consumers.

Additionally, limited motor capabilities of known machines have not allowed the operator to mix the product with a blade rotating at a variety of speeds, at different depths within the product, and for various amounts of time depending on the product. Moreover, it is sometimes desirable for a user to include solid or semi-solid ingredients in the final product. For example, nuts, granola, chocolate and other chips, foodstuffs, candy bars, cookies, fruits, or other morsels have been used to develop many flavours that are highly desired by users. Mixing can cause the solid or semi-solid ingredients to be ground or reduced in size. With existing micro puree machines, users have limited ability to control operations such as blade and motor rotation speeds depending on the type of food type being processed. Accordingly, there is a need for a micro puree machine capable of more flexibly and precisely processing various food types.

Described herein is a micro puree device in which a blade assembly may be programmably-controlled at different rotational speeds and moved up and down in different patterns and speeds, and for different periods of time, to make different food items, such as frozen purees and desserts.

This disclosure further describes a micro puree machine with a processing feature that enables more appropriate and automated processing of various food types, resulting in enhanced food preparation. The present disclosure includes a micro puree machine having a controller arranged to operate a motor, mixing shaft and blade according to a routine or processing sequence optimized for processing and/or preparing a particular food type. The micro puree machine includes a mixing or drive shaft coupled to a blade and rotatable via a drive motor and/or gear.

The controller controls a rotation speed of the drive motor and, in turn, the rotation speed of the mixing shaft and blade over one or more periods during a food processing routine and/or sequence depending on the food type that may be selected by a user via a user interface. The controller also controls a position motor arranged to change the position and/or distance that the mixing or drive shaft and blade are extended into or retracted from a mixing container, vessel, or beaker. Advantageously, the processing feature allows the user to conveniently and flexibly process various different food types while the controller is preconfigured with routines and/or recipes of various sequences of drive and/or position motor speeds and/or mixing shaft movement.

In one aspect, a micro puree machine includes a drive motor coupled to a drive shaft via at least one gear. The drive motor is arranged to rotate a drive shaft and blade assembly attached thereto such that a speed of rotation of the drive motor corresponds to a speed of rotation of the drive shaft. A position motor is operable to change a position of the drive shaft via rotation of the position motor such that a speed of rotation of the position motor corresponds to a rate of change of position of the drive shaft. A user interface is arranged to: i) receive a user input to select a first routine associated with processing a first food type of a plurality of routines associated with processing a plurality of food types, and ii) display a status of the processing of the first food type while the first routine is running. A data store is arranged to store a database including configuration data associated with the plurality of routines. A controller is arranged to: i) receive the user input selecting the first routine and retrieve the configuration data associated with the first routine from the data store, ii) control operations of the drive motor based on the configuration data associated with the first routine, and iii) control operations of the position motor based on the configuration data associated with the first routine.

Controlling operations of the drive motor may include controlling activation, deactivation, a direction of rotation, and/or a speed of rotation of the drive motor. Controlling operations of the position motor may include controlling activation, deactivation, a direction of rotation, and a speed of rotation of the position motor. The controller may be arranged to receive timing data from a timer such that the controller controls operations of the drive motor and the position motor based on the configuration data and the timing data. The timer may include a clock operated by a processor associated with the controller.

The configuration data may include a first zone designation of a plurality of zone designations. The first zone designation may be associated with a full volume of a container holding the first food type. A second zone designation may be associated with a top portion of the volume of the container and a third zone designation may be associated with a bottom portion of the volume of the container. The user interface may be configured to receive a user selection of one of a plurality of zones associated with different portions of a container volume holding the first food type.

A food processing routine may include a plurality of phases. The number of phases may be different between the first routine and a second routine. Each phase may correspond to a time period. The time period of at least two phases may be the same. The user interface may display the progress and/or status of processing of the first food type while the first routine is running by displaying a number associated with each phase of the operations of the routine. The value of the number may decrease as the routine enters each phase sequentially in time until the routine is finished.

In another aspect, a food processor motor control system includes a drive motor coupled to a drive shaft via at least one gear. The drive motor is arranged to rotate a drive shaft and blade assembly attached thereto such that a speed of rotation of the drive motor corresponds to a speed of rotation of the drive shaft. A position motor is operable to change a position of the drive shaft via rotation of the position motor such that a speed of rotation of the position motor corresponds to a rate of change of position of the drive shaft. A user interface is arranged to: i) receive a user input to select a first routine associated with processing a first food type of a plurality of routines associated with processing a plurality of food types, and ii) display a status of the processing of the first food type while the first routine is running. A data store is arranged to store a database including configuration data associated with the plurality of routines. A controller is arranged to: i) receive the user input selecting the first routine and retrieve the configuration data associated with the first routine from the data store, ii) control operations of the drive motor based on the configuration data associated with the first routine, and iii) control operations of the position motor based on the configuration data associated with the first routine.

In a further aspect, a method for manufacturing a motor controller of a food processor device includes mounting in or on a housing of the food processor at least the following:

a drive motor coupled to a drive shaft via at least one gear, the drive motor arranged to rotate a drive shaft and blade assembly attached thereto, a speed of rotation of the drive motor corresponding to a speed of rotation of the drive shaft;

a position motor operable to change a position of the drive shaft via rotation of the position motor, a speed of rotation of the position motor corresponding to a rate of change of position of the drive shaft;

a user interface arranged to: i) receive a user input to select a first routine associated with processing a first food type of a plurality of routines associated with processing a plurality of food types, and ii) display a status of the processing of the first food type while the first routine is running;

a data store arranged to store a database including configuration data associated with the plurality of routines; and a controller arranged to: i) receive the user input selecting the first routine and retrieve the configuration data associated with the first routine from the data store, ii) control operations of the drive motor based on the configuration data associated with the first routine, and iii) control operations of the position motor based on the configuration data associated with the first routine.

A reading of the following description and a review of the associated drawings will make apparent the advantages of these and other features. Both the foregoing general description and the following detailed description serve as an explanation only and do not restrict aspects of the disclosure as claimed.

BRIEF DESCRIPTION OF THE DRAWINGS

FIG. 16 shows a process for manufacturing a motor controller for food processor device arranged to perform various food processing routines.

DETAILED DESCRIPTION

Figure 1:
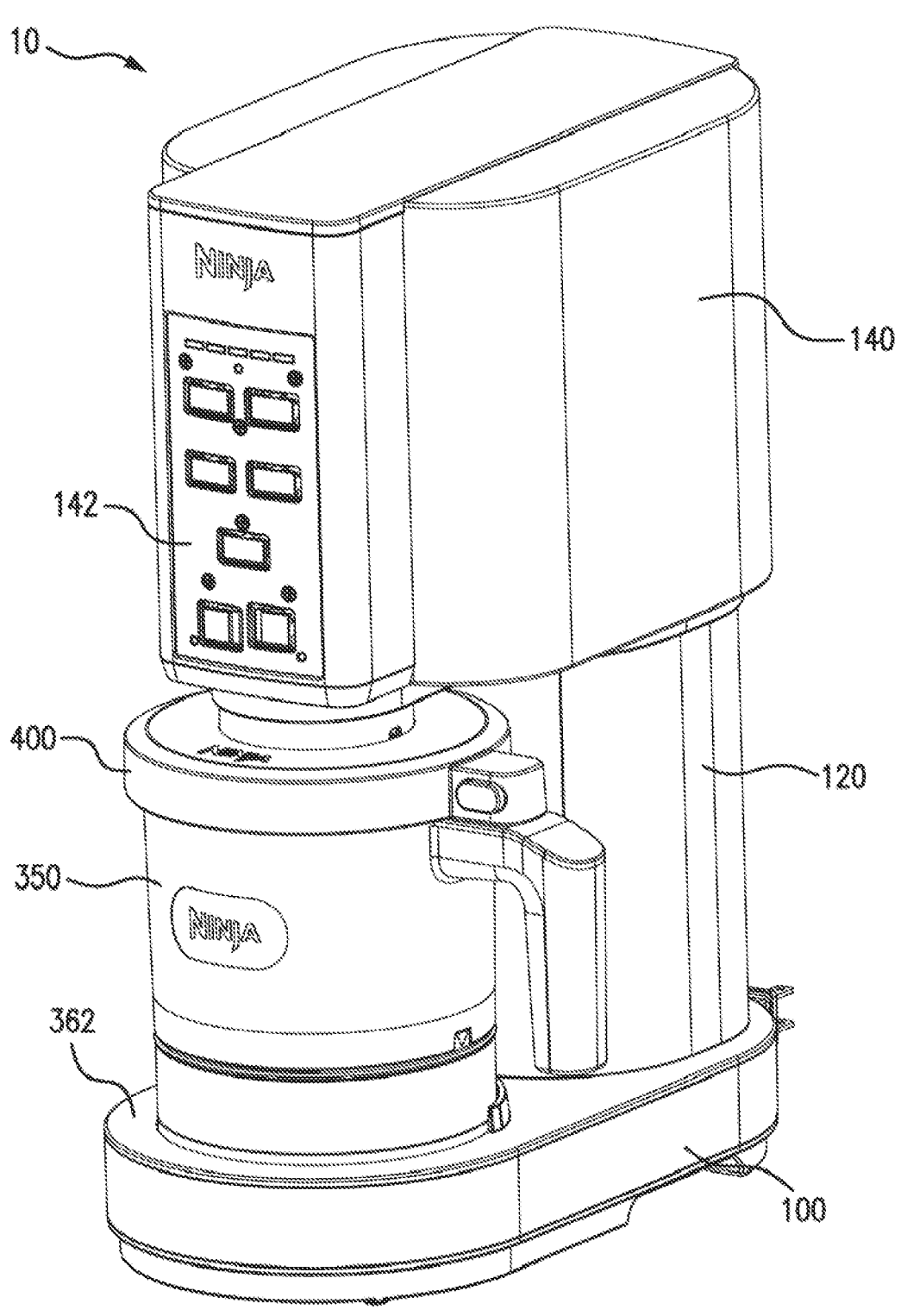
FIG. 1 is an isometric view of a device according to an illustrative embodiment of the present disclosure including a bowl assembly and lid assembly.

As shown in FIG. 1, the device 10 includes a lower housing or base 100 and an upper housing 140. A middle housing 120 extends between the lower housing 100 and the upper housing 140. The upper housing 140 includes an interface 142 for receiving user inputs to control the device 10 and/or display information, including inputs to select a particular program to control speed of blade rotation, descent speed etc. depending on the desired product. The interface 142 may also include a progress bar displaying the progression of the selected program. The device 10 includes a removable bowl assembly 350 and lid assembly 400 on the base 100. The bowl assembly 350 receives one or more ingredients for processing. The bowl assembly 350 and lid assembly 400 are placed on the lower housing 100. The bowl assembly 350 and lid assembly 400 are rotatable on a lifting platform 362 from a down position to an up position, and vice versa.

Figure 2:
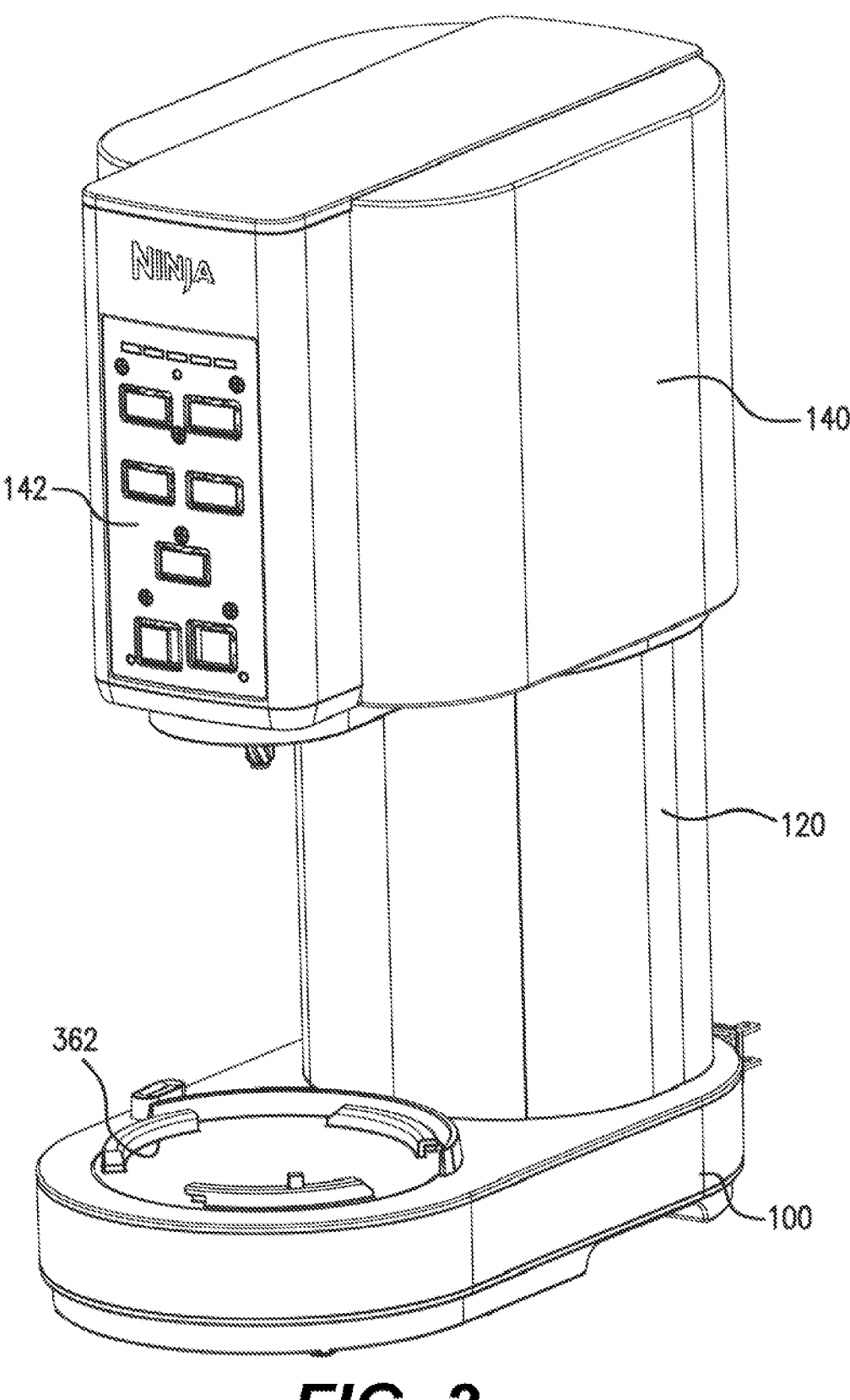
FIG. 2 is another isometric view of the device of FIG. 1 without the bowl assembly and lid assembly.

FIG. 2 shows the device 10 with the bowl assembly 350 and lid assembly 400 removed.

Figure 3A:
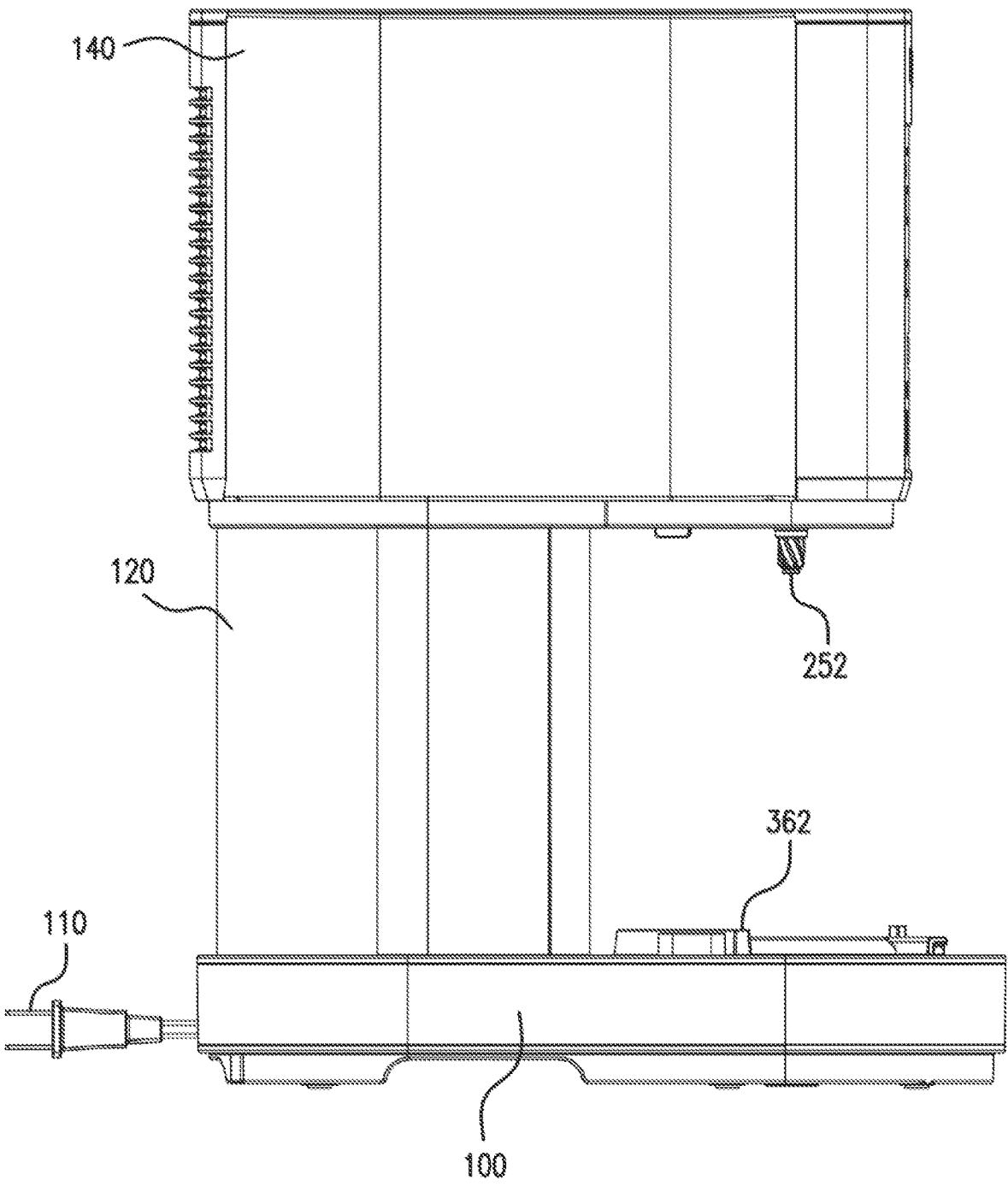
FIG. 3A is a left side view of the device of FIG. 1 without the bowl assembly and lid assembly.
Figure 3B:
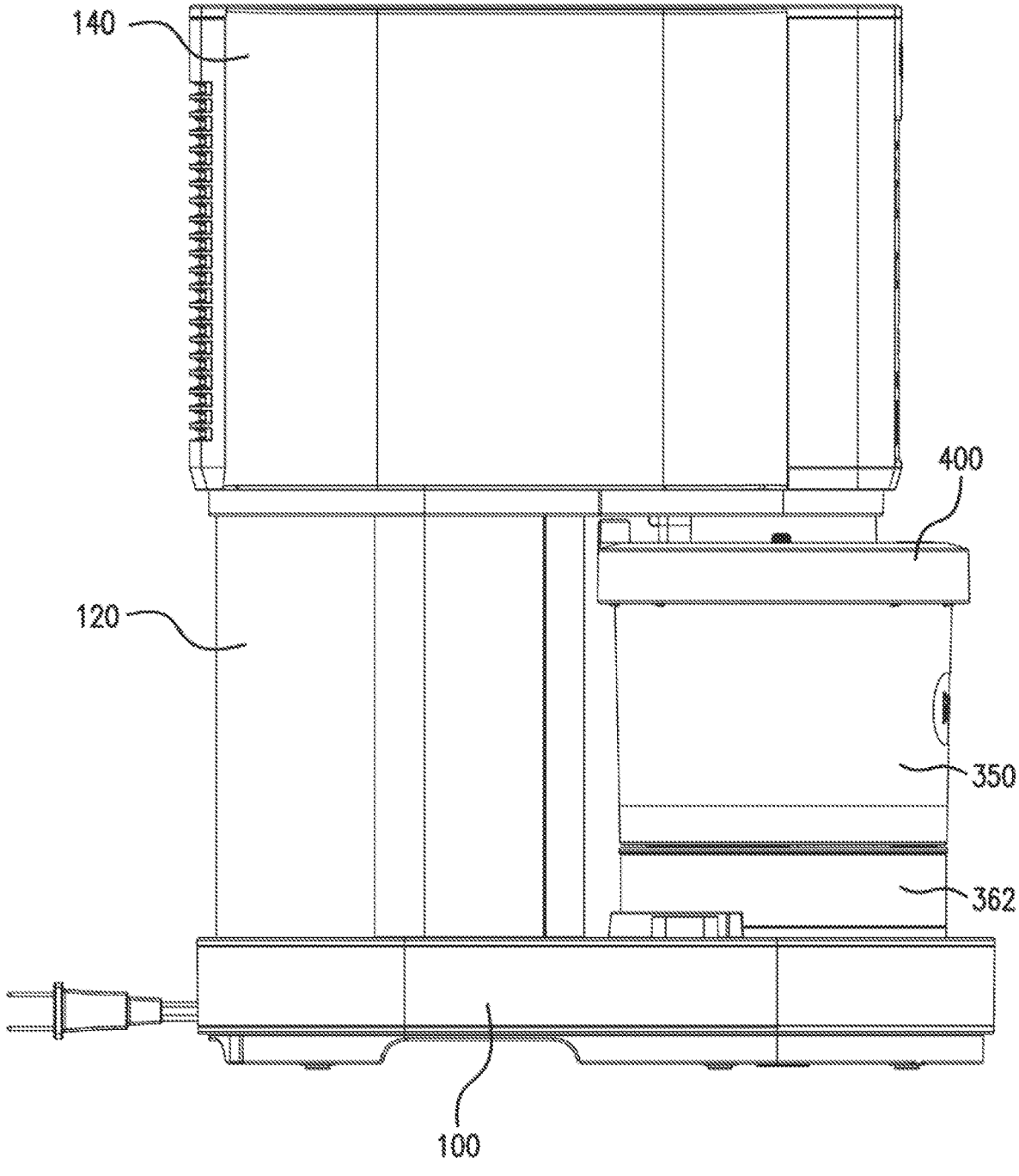
FIG. 3B is a left side view of the device of FIG. 1 with the bowl assembly and lid assembly in an up position.
Figure 3C:
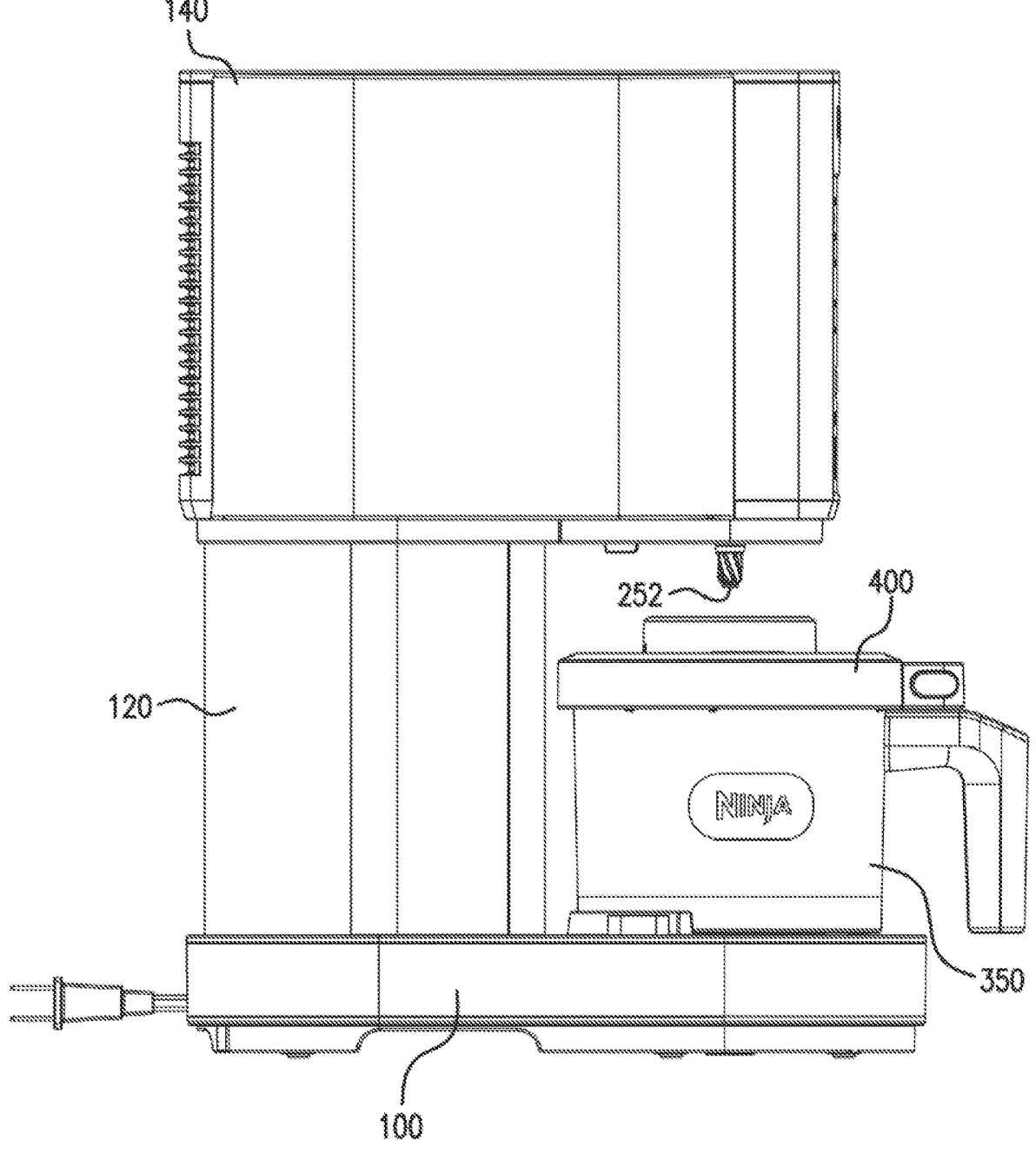
FIG. 3C is a left side view of the device of FIG. 1 with the bowl assembly and lid assembly in a down position.

FIGS. 3A-3C illustrate left side views of the device 10 without a bowl assembly 350 and lid assembly 400, with the bowl assembly 350 and lid assembly 400 in an up position, and with the bowl assembly 350 and lid assembly 400 in a down position, respectively.

Figure 4A:
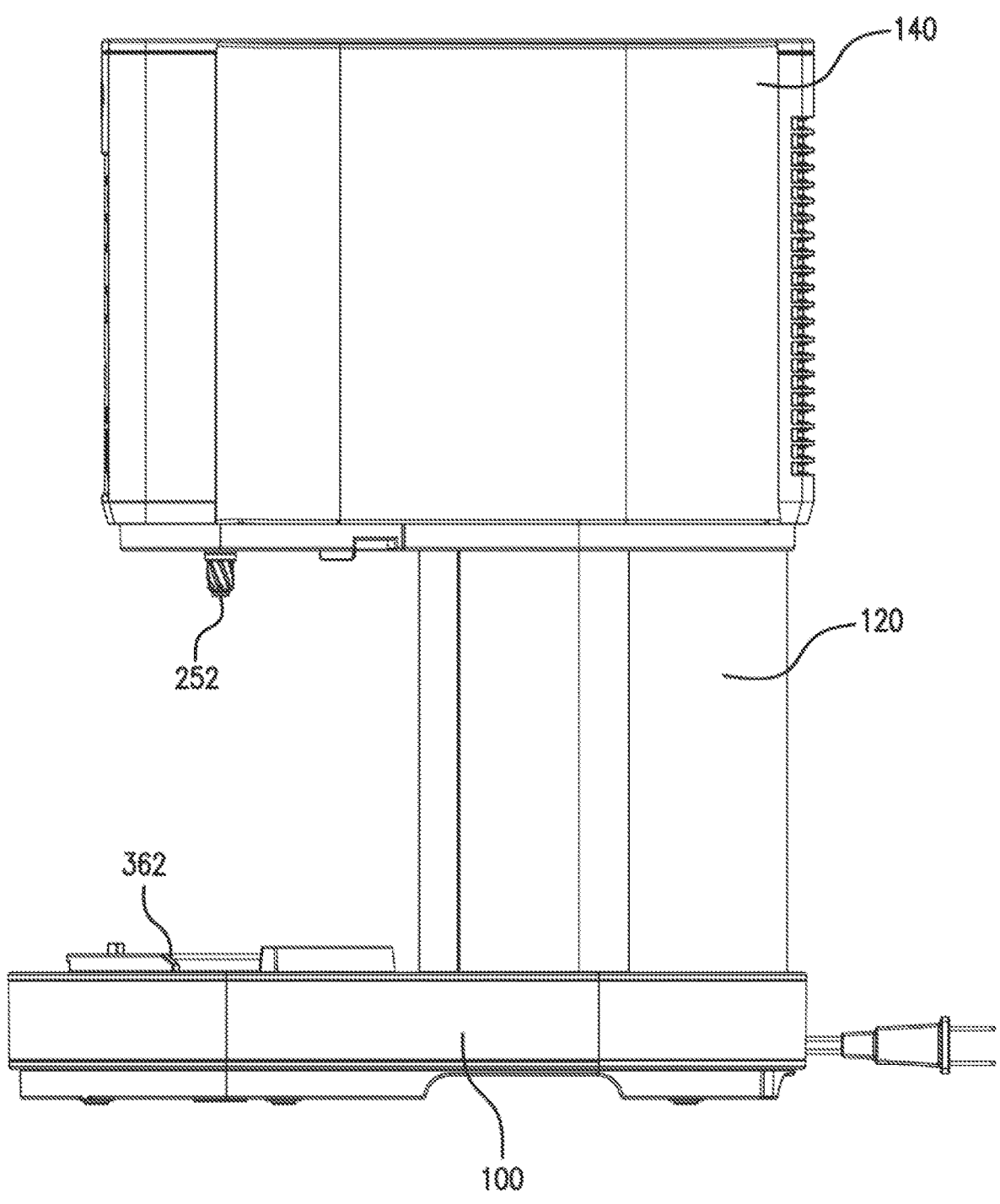
FIG. 4A is a right side view of the device of FIG. 1 without the bowl assembly and lid assembly.
Figure 4B:
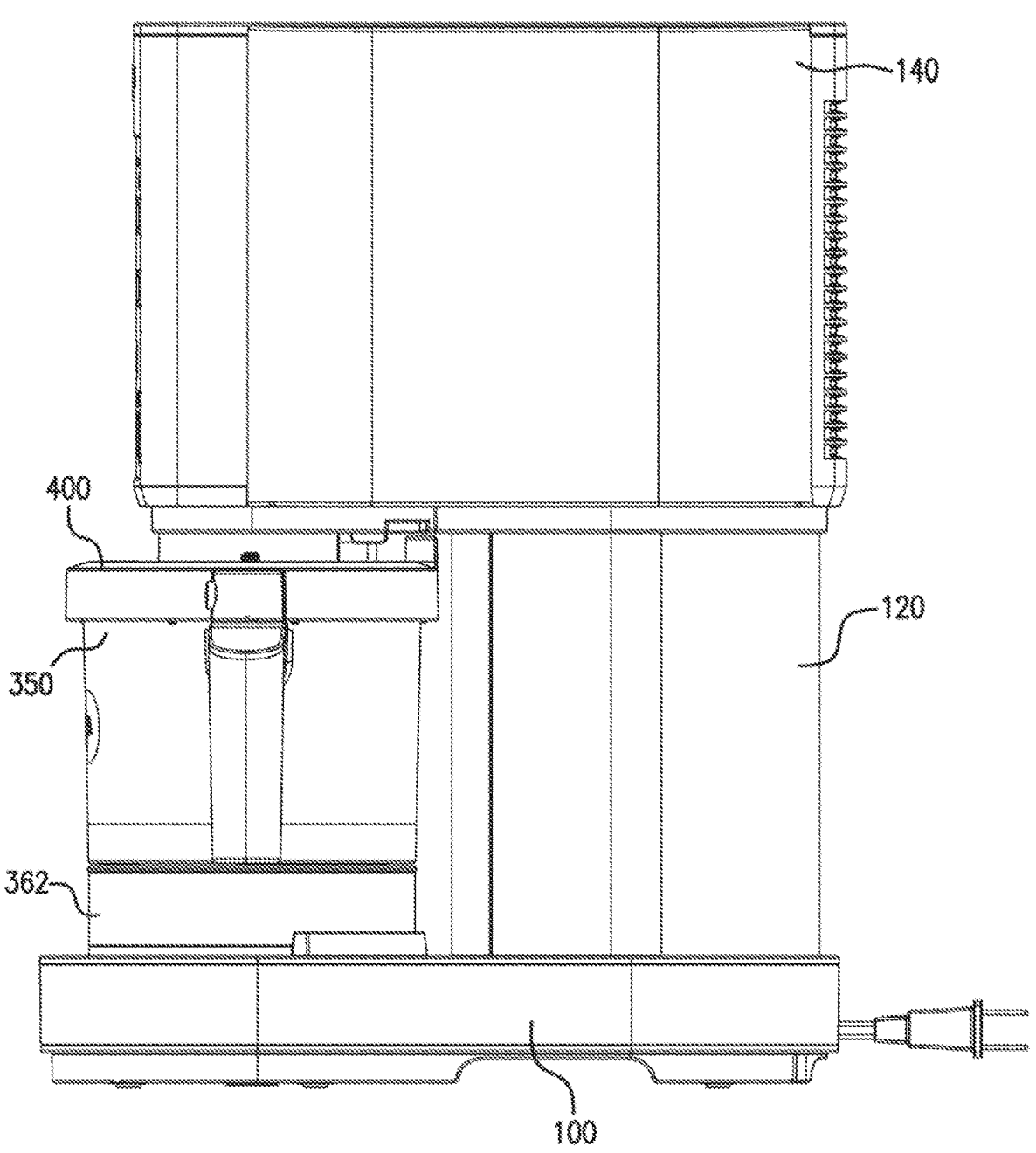
FIG. 4B is a right side view of the device of FIG. 1 with the bowl assembly and lid assembly in an up position.
Figure 4C:
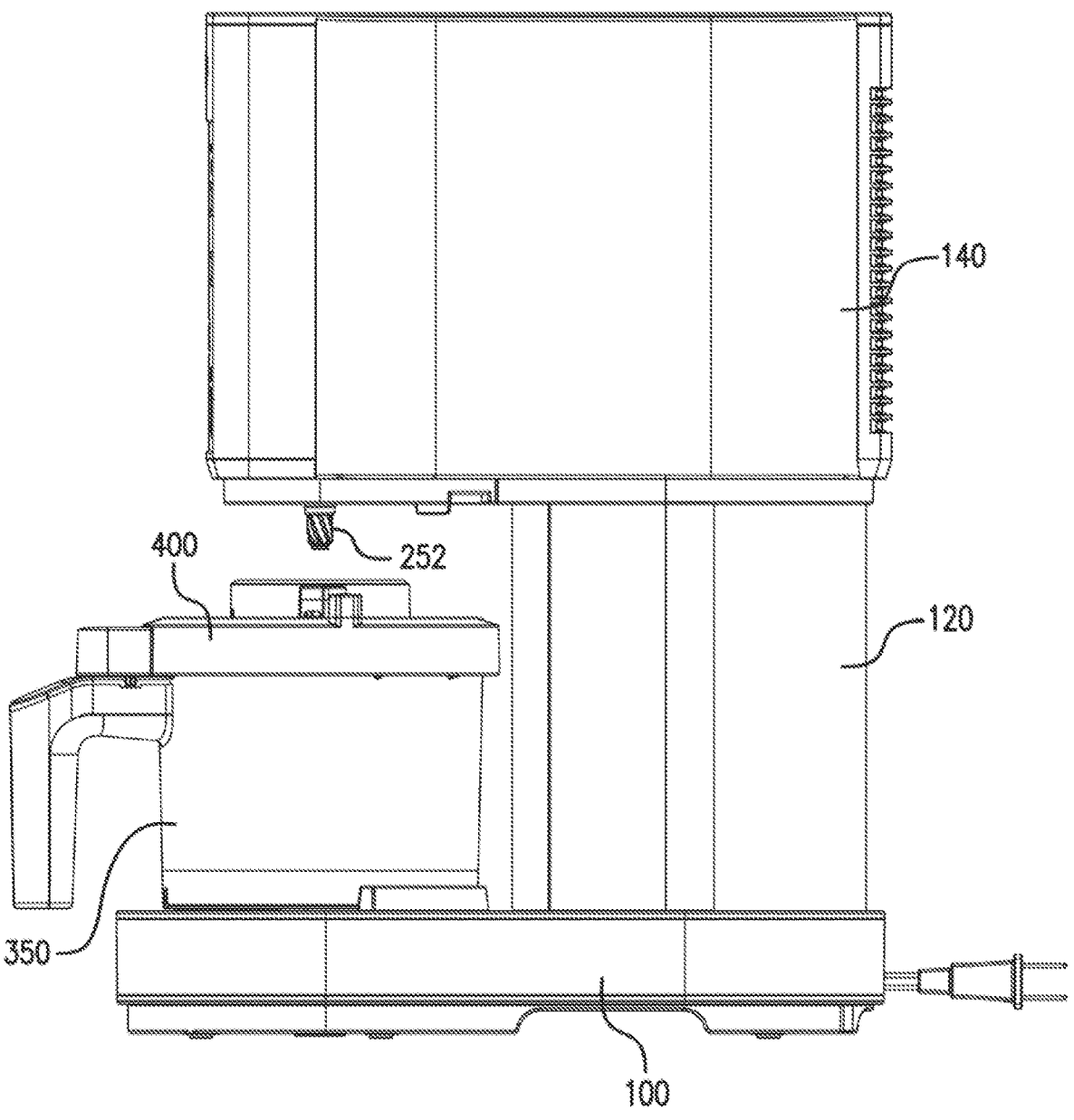
FIG. 4C is a right side view of the device of FIG. 1 with the bowl assembly and lid assembly in a down position.

FIGS. 4A-4C illustrate right side views of the device 10 without a bowl assembly 350 and lid assembly 400, with the bowl assembly 350 and lid assembly 400 in an up position, and with the bowl assembly 350 and lid assembly in a down position, respectively. When the bowl assembly 350 and lid assembly 400 are raised vertically to the up position, a blade assembly 300 within the lid assembly 400 engages with a power coupling 252 at the distal end of power shaft 250 extending from the upper housing 140. A rotational force is delivered via the power coupling 252 to the blade assembly 300 to spin one or more blades as they engage with ingredients inside the bowl assembly 350.

Figures 5A, 5B:
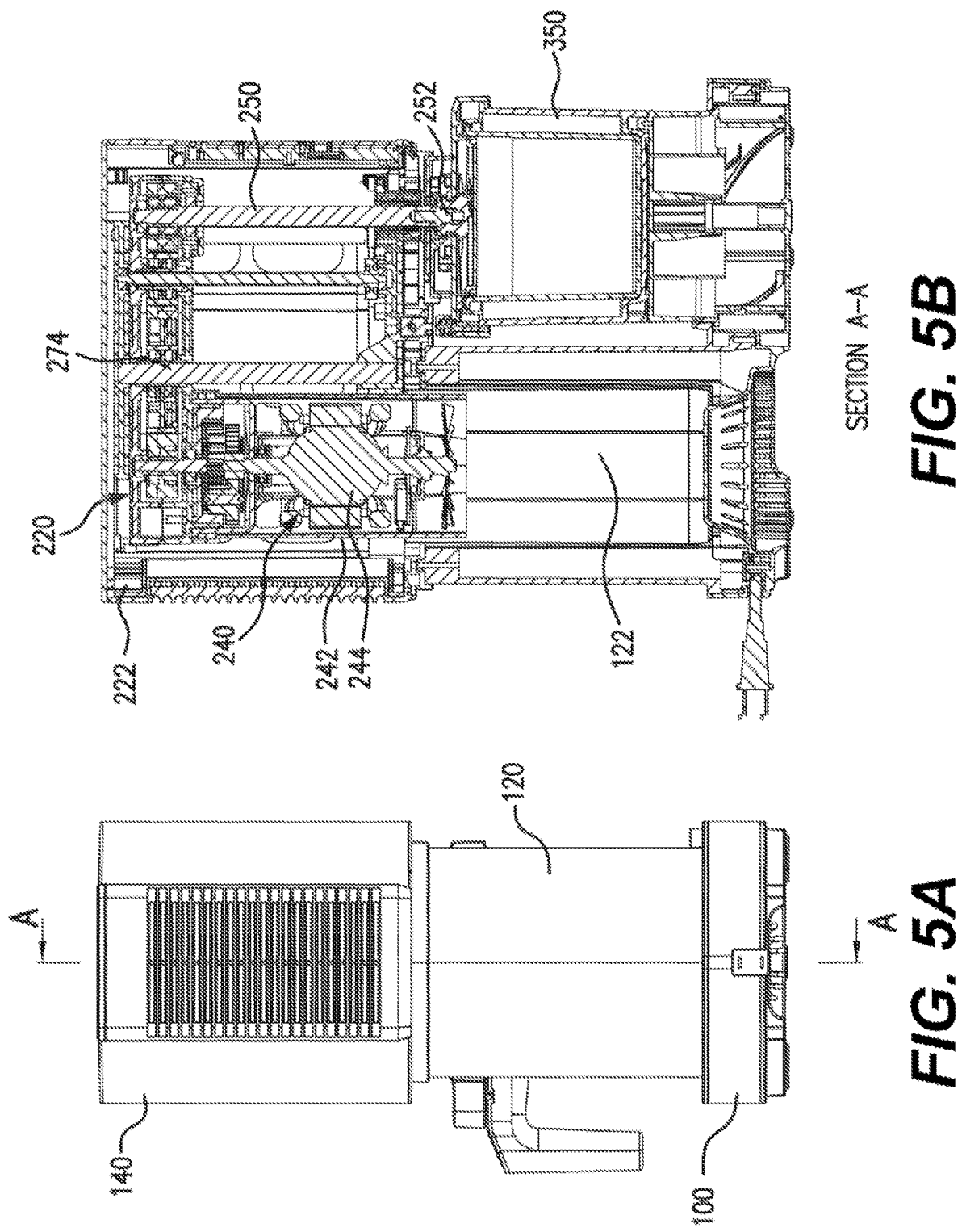
FIG. 5A is a rear view of the device of FIG. 1 with the bowl assembly and lid assembly in an up position.
FIG. 5B is a right side cutaway view of the device of FIG. 5A along section A-A.

FIG. 5A is rear view of the device 10, with the bowl assembly 350 in the up position, showing a section line A-A. FIG. 5B is right side cutaway view of the device 10 along section A-A.

Figures 6A, 6B:
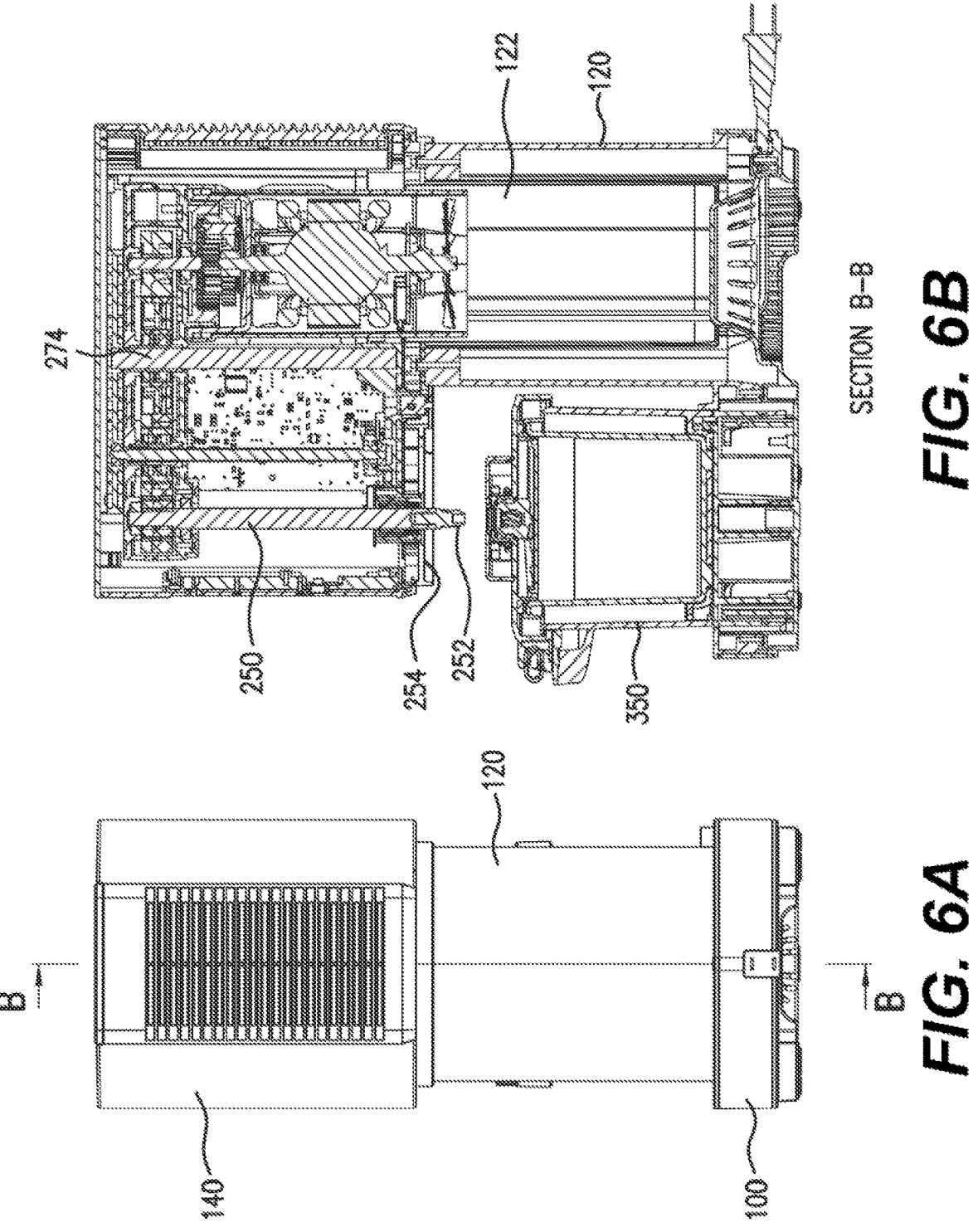
FIG. 6A is a rear view of the device of FIG. 1 with the bowl assembly and lid assembly in a down position.
FIG. 6B is a left side cutaway view of the device of FIG. 6A along section B-B.

FIG. 6A is rear view of the device 10, with the bowl assembly 350 in the down position, showing a section line B-B. FIG. 6B is a left side cutaway view of the device 10 along section B-B. The upper housing 140 includes gearbox assembly 220 and a drive motor assembly 240 connected to the gearbox assembly 220. The drive motor assembly 240 includes a drive motor housing 242 and a drive motor 244. The gearbox assembly 220 includes a gearbox housing 222 containing a plurality of gears for delivering power from the drive motor 244 to a power shaft 250. The power coupling 252 is positioned on a distal end of the power shaft 250.

Figure 7:
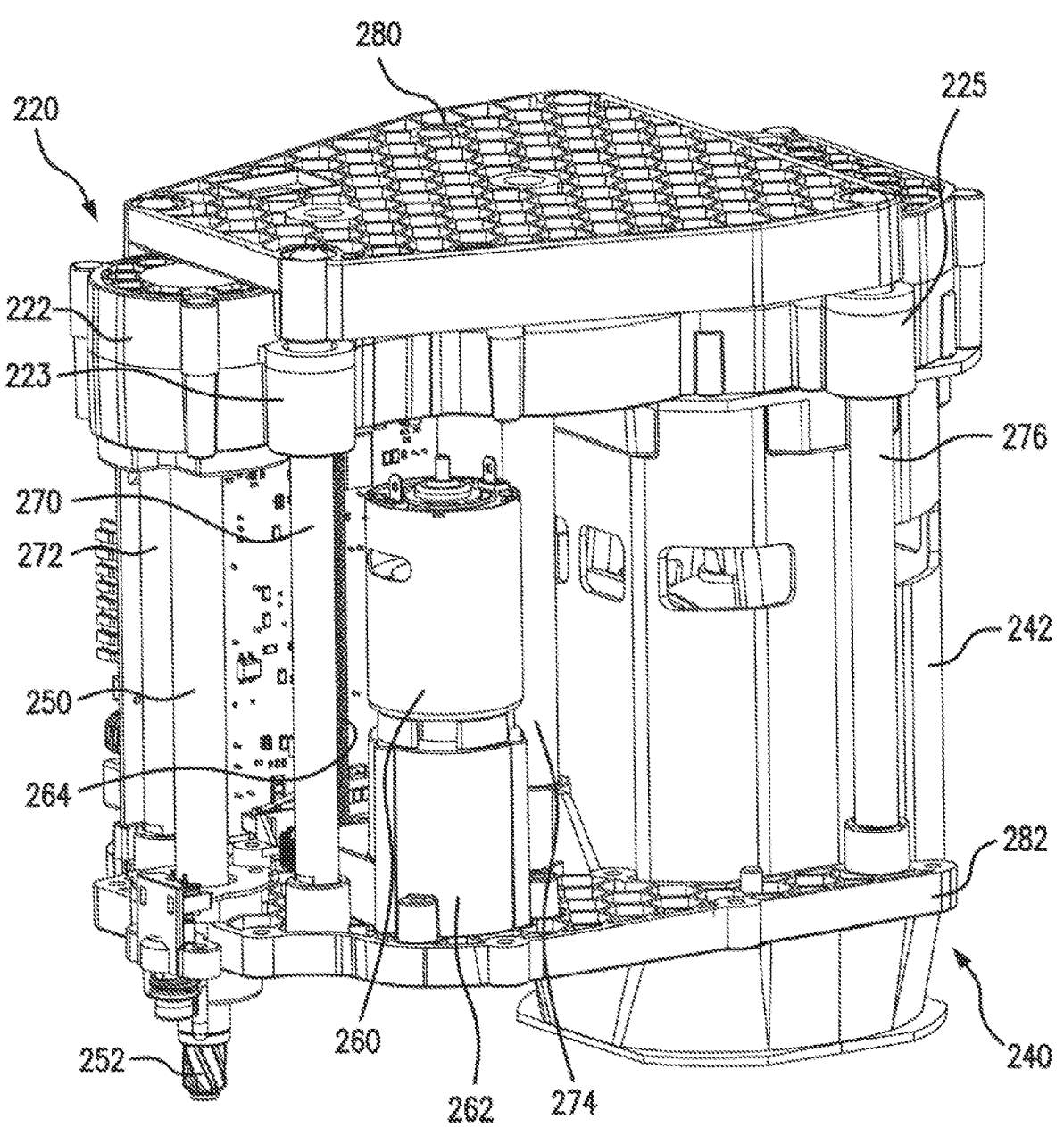
FIG. 7 is an isometric view of internal components of the device of FIG. 1.

FIG. 7 is an isometric view of the gearbox assembly 220 and drive motor assembly 240 of the device 10 with surrounding structure. The device 10 includes an upper support 280 and a lower support 282 positioned in the upper housing 140. The gearbox assembly 220 and drive motor assembly 240 are slidable up and down with respect to the upper and lower supports 280, 282 along a plurality of pillars 270, 272, 274, 276. The pillars and supports provide rigidity and concentric alignment. In the illustrative embodiment, the gearbox assembly 220 and drive motor assembly 240 are supported on the pillars via apertures 223, 225 in the gearbox housing 222. In other embodiments, there may be apertures on the drive motor housing 242 in addition to or instead of on the gearbox housing 222.

The device 10 includes a position motor 260 (e.g., DC motor) which drives a gearbox 262. The gearbox 262 is engaged with a vertical threaded rod or worm gear 264 extending between the upper and lower supports 280, 282. Actuation of the position motor 260, either manually via the interface 142 or automatically, moves the gearbox assembly 220 and drive motor assembly 240 up and down. The rod pitch of the worm gear 264 relate to a vertical decent rate of the device 10. The drive motor assembly 240 moves down into a cavity 122 in the middle housing 120 (see FIGS. 5B and 6B).

The power shaft 250 and power coupling 252 move together with the gearbox assembly 220 and drive motor assembly 240. Thus, actuation of the position motor 260 in turn allows for vertical movement and positioning of a blade assembly 300 removably attached to the power coupling 252. In the illustrative embodiment, the up and down travel distance is between 70 and 120 mm, or between 90 and 100 mm, such as about 94 mm. Different programs selected by a user at the interface 142 may be used to control the power coupling 252, and therefore the blade assembly 300, at different rotational speeds (e.g., via the drive motor 244) and moved up and down (e.g., via the position motor 260) in different patterns and speeds to make different food items such as frozen purees and desserts.

Figures 8A, 8B:
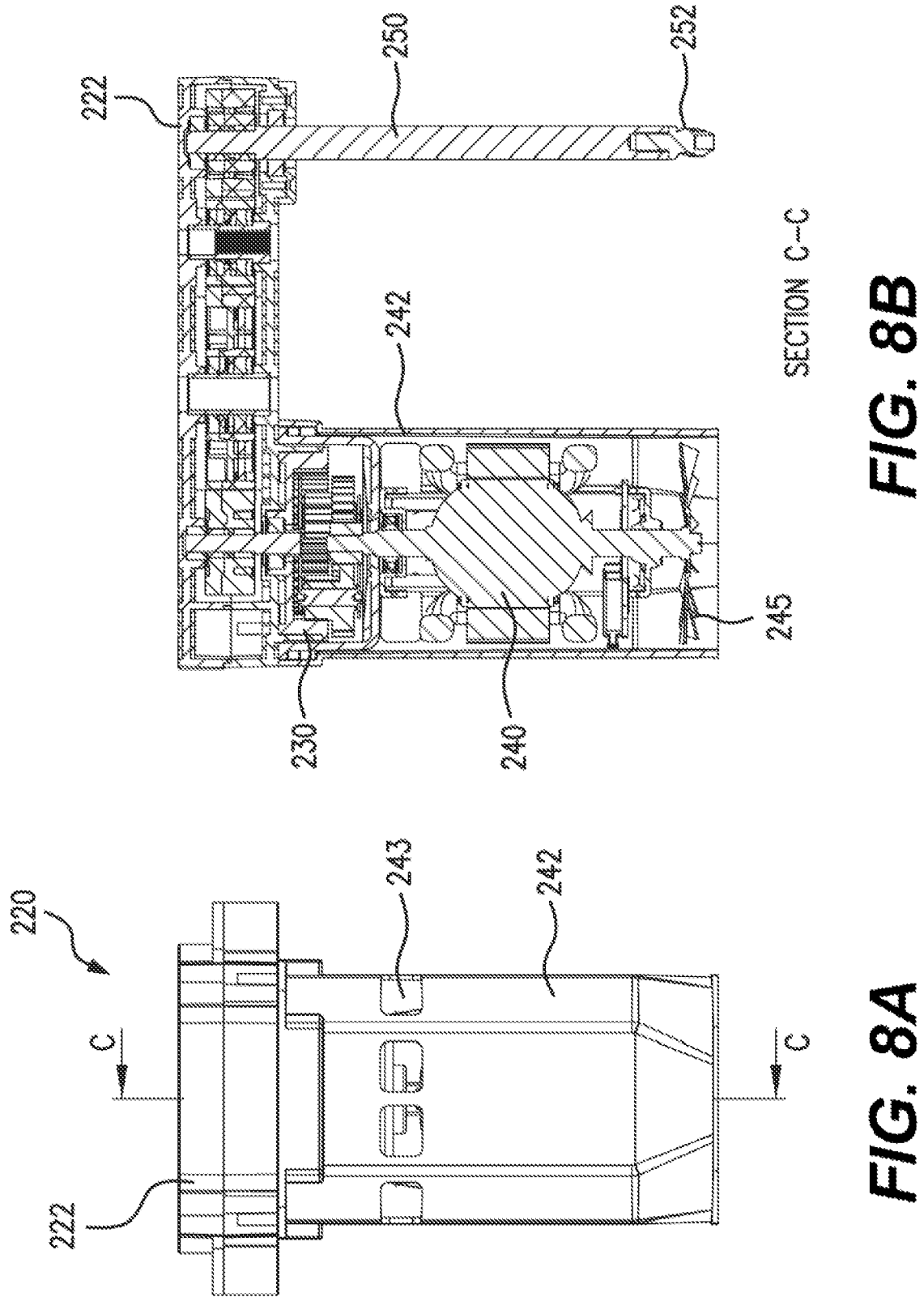
FIG. 8A is front view of gearbox and drive motor assemblies of the device of FIG. 1.
FIG. 8B is side cutaway view of the assemblies of FIG. 8A along section C-C.

FIG. 8A is front view of the gearbox assembly 220 and drive motor assembly 240 of the device 10 of FIG. 1. FIG. 8B is side cutaway view of the assemblies of FIG. 8A along a section C-C. As discussed above, the gear assembly 220 includes a housing 222. In the illustrative embodiment, the housing 222 includes upper and lower portions removably attached together. A housing 242 of the drive motor assembly 240 is removably attached to the lower portion of the housing 222. In other embodiments, the housing 242 is formed together with the housing 222 or at least together with the lower portion of the housing 222. In the illustrative embodiment, the housing 242 includes a plurality of openings 243 for ventilation and cooling of the drive motor 244. The device 10 may further include a fan 245 on the motor 244.

Figure 9:
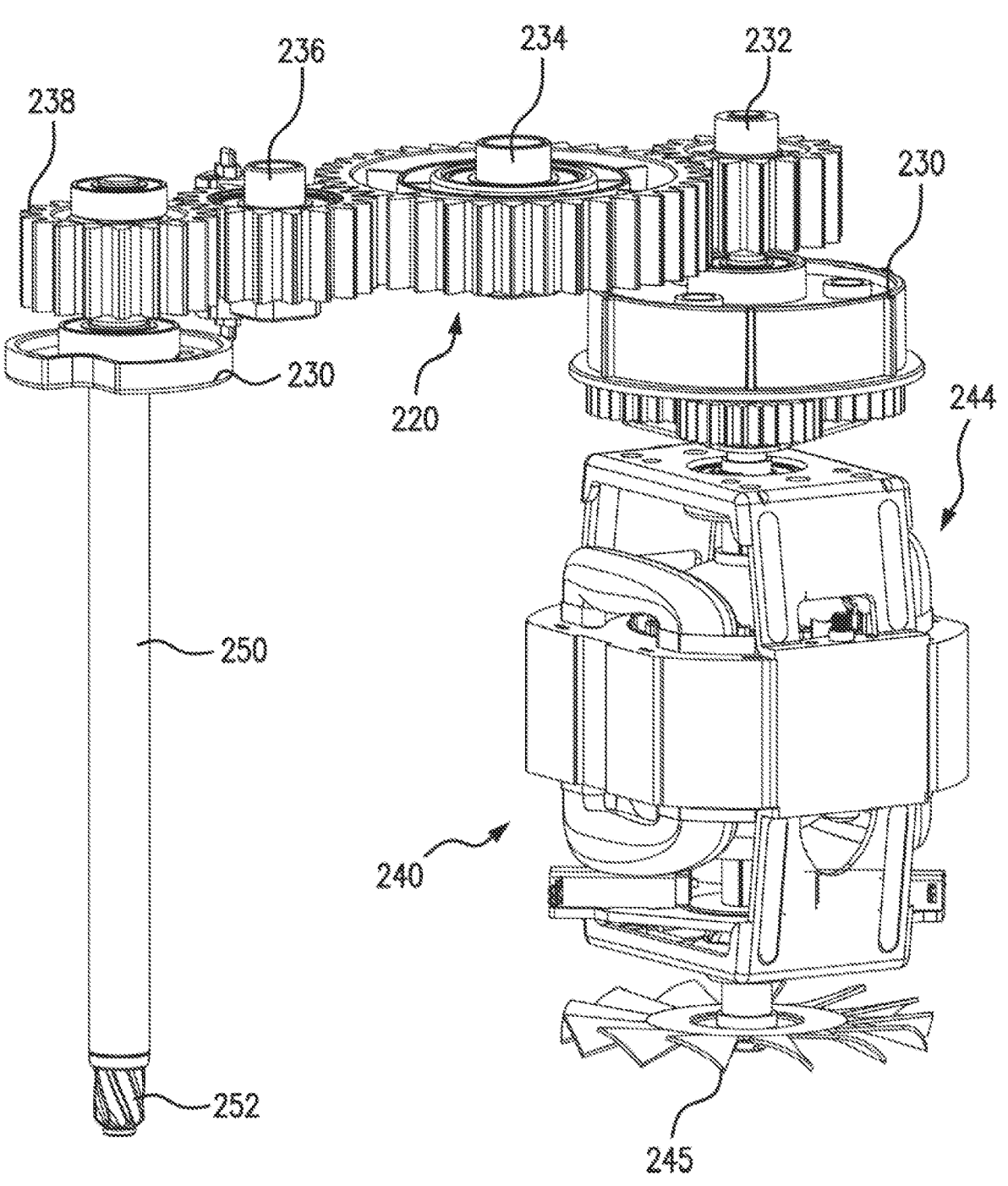
FIG. 9 is an isometric view of the gearbox and drive motor assemblies of the device with housings removed.

FIG. 9 is an isometric view of the gearbox assembly 220 and drive motor assembly 240 with the housings 222, 242 removed. In the illustrative embodiment, the drive motor 244 is rotatably connected to a transmission 230. The transmission 230 is connected to a first gear 232. The first gear 232 drives a gear 238, either directly or through one or a plurality of intermediate gears 234, 236, which then drives the power shaft 250.

Figure 10:
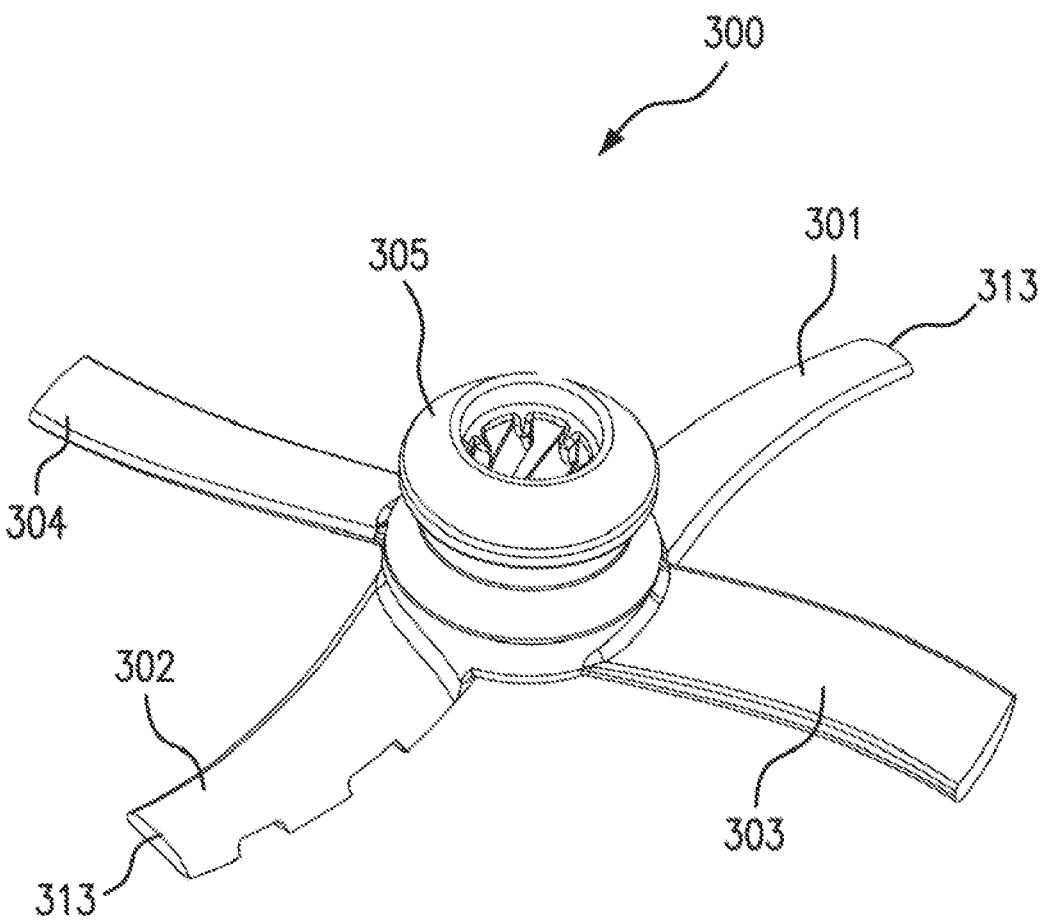
FIG. 10 is an isometric view of the blade assembly of the device of FIG. 1.

FIG. 10 is an isometric view of the moving blade assembly 300 for processing food and beverage items. Food processing routines and/or sequences may be varied depending the on the size of the blade assembly.

Figure 11:
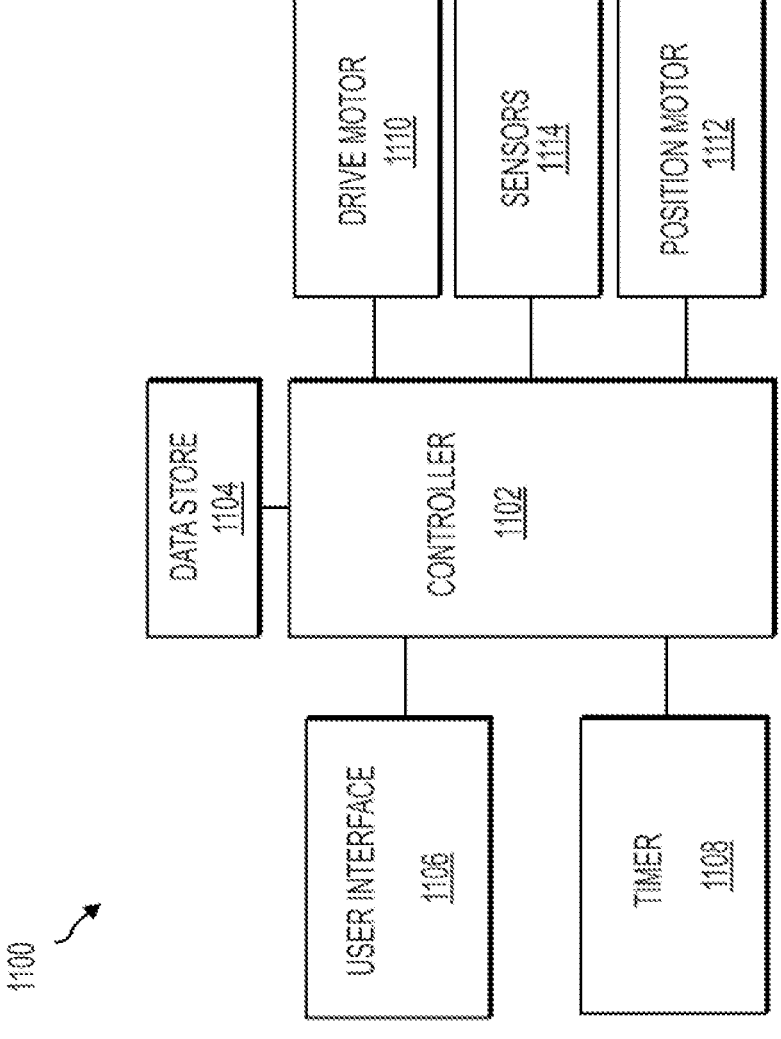
FIG. 11 is a block diagram of a controller used to control operations of the drive and position motor during various food processing routines.

FIG. 11 is a block diagram of a food processing control system 1100 including controller 1102 used to control operations of drive motor 1110 and position motor 1112 while various food processing routines are running. System 1100 includes user interface 1106, timer 1108, a data store 1104, and one or more sensors 1114. The drive motor 1110 may be coupled to a drive and/or power shaft 250 via at least one gear. The drive motor 1110 may be arranged to rotate the drive shaft 250 and blade assembly 300 attached thereto such that a speed of rotation of the drive motor 1110 corresponds to a speed of rotation of drive shaft 250. However, the speeds do not have to be the same as the speed of the drive shaft 250 will depend on the reduction ratio of the at least one gear. Position motor 1112 may be operable to change a position of drive shaft 250 via rotation of position motor 1112 such that a speed of rotation of position motor 1112 corresponds to a rate of change of position of the drive shaft and/or an assembly holding the drive shaft. Position motor 1112 may change the position of drive shaft 205 by changing the position of a housing and/or gear assembly associated with drive motor 1110. The direction of rotation of position motor 1112 may be controlled by controller 1102 to extend or retract drive shaft 250 to or from the micro puree and/or device 10 housing.

Controller 1102 may also control the direction of rotation of drive shaft 250 and/or blade assembly 300. User interface 1106 may be arranged to: i) receive a user input to select a first routine associated with processing a first food type of a plurality of routines associated with processing a plurality of food types, and ii) display a status of the processing of the first food type, via indicator 1302 of FIG. 13, while the first routine is running. A data store 1104 may be arranged to store a database, such as shown in Tables 1400 and 1500, including configuration data associated with the plurality of routines. A controller 1102 may be arranged to: i) receive the user input selecting the first routine and retrieve the configuration data associated with the first routine from data store 1104, ii) control operations of drive motor 1110 based on the configuration data associated with the first routine, and iii) control operations of position motor 1112 based on the configuration data associated with the first routine.

System 1100 may include one or more sensors associated with running a routine. For example, a sensor may be used to monitor the speed of drive motor 1110. A sensor may be used to monitor the speed of position motor 1112. One or more sensors may be used to monitor the position of drive shaft 250. The sensors may include magnetic or contact switches that detect when drive shaft 250 is in its retracted position, an intermediate position, and/or a fully extended position. Controller 1102 may use timing data from timer 1108 and sensor speed data associated with the rotation of position motor 1112 to determine the distance traveled and/or position of drive shaft 250.

Controlling operations of drive motor 1110 may include controlling activation (e.g., start), deactivation (e.g., stop), a direction of rotation, and/or a speed of rotation drive motor 1110. Controlling operations of position motor 1112 may include controlling activation, deactivation, a direction of rotation, and/or a speed of rotation of position motor 1112. Controller 1102 may be configured to receive timing data from a timer 1108 and control operations of drive motor 1110 and position motor 1112 based on the configuration data and the timing data. The timer 1108 may be a software program that accesses clock operated by a processor such as computer 1200 associated with the controller 1102.

Figure 12:
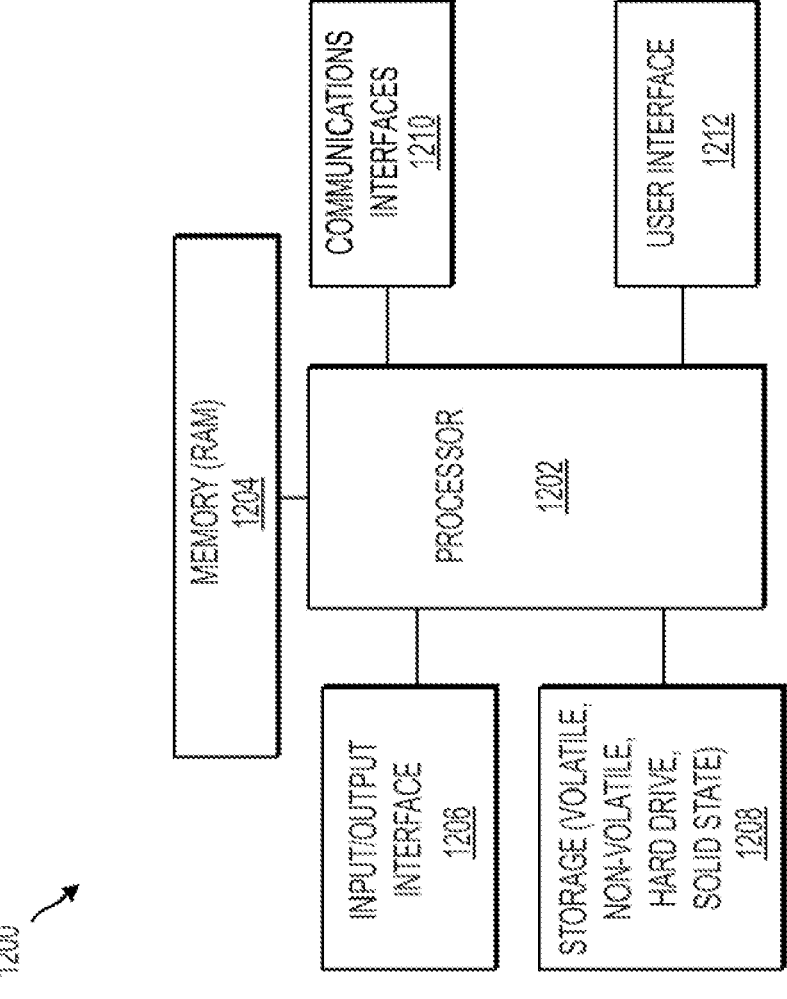
FIG. 12 is a block diagram of a computing system.

FIG. 12 is a block diagram of a computing system 1200 associated with controller 1102. Computer system 1200 could represent a processing system within a device such as, for example, a micro puree machine, a blender, an ice cream maker, an immersion blender, or an attachment to any of such devices. Computer system 1200 may include a system-on-a-chip (SoC), a client device, and/or a physical computing device and may include hardware and/or virtual processor(s). In some implementations, computer system 1200 and its elements as shown in FIG. 12 each relate to physical hardware and in some implementations one, more, or all of the elements could be implemented using emulators or virtual machines. Regardless, computer system 1200 may be implemented on physical hardware.

As also shown in FIG. 12, computer system 1200 may include a user interface 1212 and/or 1106, having, for example, a keyboard, keypad, touchpad, or sensor readout (e.g., biometric scanner) and one or more output devices, such as displays, speakers for audio, LED indicators, and/or light indicators. Computer system 1200 may also include communications interfaces 1210, such as a network communication unit that could include a wired communication component and/or a wireless communications component, which may be communicatively coupled to processor 1202.

The network communication unit may utilize any of a variety of proprietary or standardized network protocols, such as Ethernet, TCP/IP, to name a few of many protocols, to effect communications between processor 1202 and another device, network, or system. Network communication units may also comprise one or more transceivers that utilize the Ethernet, power line communication (PLC), Wi-Fi, cellular, and/or other communication methods.

Computer system 1200 includes a processing element, such as processor 1202, that contains one or more hardware processors, where each hardware processor may have a single or multiple processor cores. In one implementation, the processor 1202 includes at least one shared cache that stores data (e.g., computing instructions) that are utilized by one or more other components of processor 1202. For example, the shared cache may be a locally cached data stored in a memory for faster access by components of the processing elements that make up processor 1202. Examples of processors include, but are not limited to, a central processing unit (CPU) and/or microprocessor. Processor 1202 may utilize a computer architecture base on, without limitation, the Intel® 8051 architecture, Motorola® 68HCX, Intel® 80×86, and the like. The processor 1202 may include, without limitation, an 8-bit, 12-bit, 16-bit, 32-bit, or 64-bit architecture. Although not illustrated in FIG. 12, the processing elements that make up processor 1202 may also include one or more other types of hardware processing components, such as graphics processing units (GPUs), application specific integrated circuits (ASICs), field-programmable gate arrays (FPGAs), and/or digital signal processors (DSPs).

FIG. 12 illustrates that memory 1204 may be operatively and communicatively coupled to processor 1202. Memory 1204 may be a non-transitory medium configured to store various types of data. System 1200 may include one or more storage devices 1208 that include a non-volatile storage device and/or volatile memory. Volatile memory, such as random-access memory (RAM), can be any suitable non-permanent storage device. The non-volatile storage devices 1208 may include one or more disk drives, optical drives, solid-state drives (SSDs), tape drives, flash memory, read-only memory (ROM), and/or any other type memory designed to maintain data for a duration time after a power loss or shut down operation. In certain configurations, the non-volatile storage devices 1208 may be used to store overflow data if allocated RAM is not large enough to hold all working data. The non-volatile storage devices 1208 may also be used to store programs, such as programs that run one or more food processing routines and/or recipes, that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 1202. In one implementation, the compiling process of the software program may transform program code written in a programming language to another computer language such that the processor 1202 is able to execute the programming code. For example, the compiling process of the software program may generate an executable program that provides encoded instructions (e.g., machine code instructions) for processor 1202 to accomplish specific, non-generic, particular computing functions.

After the compiling process, the encoded instructions may be loaded as computer executable instructions or process steps to processor 1202 from storage 1208, from memory 1204, and/or embedded within processor 1202 (e.g., via a cache or on-board ROM). Processor 1202 may be configured to execute the stored instructions or process steps in order to perform instructions or process steps to transform the computing device into a non-generic, particular, specially programmed machine or apparatus. Stored data, e.g., data stored by a storage device 1208, may be accessed by processor 1202 during the execution of computer executable instructions or process steps to instruct one or more components within computing system 1200 and/or other components or devices external to system 1200.

User interface 1212 can include a display, positional input device (such as a mouse, touchpad, touchscreen, or the like), keyboard, keypad, one or more buttons, or other forms of user input and output devices. The user interface components may be communicatively coupled to processor 1202 and/or controller 1102. When the user interface output device is or includes a display, the display can be implemented in various ways, including by a liquid crystal display (LCD) or a cathode-ray tube (CRT) or light emitting diode (LED) display, such as an OLED display. Input/Output Interface 1206 may interface with one or more sensors, e.g., sensors 1114, that detect and/or monitor environmental conditions within or surrounding system 1200. Environmental conditions may include, without limitation, magnetic field level, rotation and/or movement of a device or component, temperature, pressure, acceleration, vibration, motion, radiation level, position or the device or component, and/or the presence of a device or component. Persons of ordinary skill in the art are aware that computer system 1200 may include other components well known in the art, such as power sources and/or analog-to-digital converters, not explicitly shown in FIG. 12.

In some implementations, computing system 1200 and/or processor 1202 includes an SoC having multiple hardware components, including but not limited to:

a microcontroller, microprocessor or digital signal processor (DSP) core and/or multiprocessor SoCs (MP-SoC) having more than one processor cores;

memory blocks including a selection of read-only memory (ROM), random access memory (RAM), electronically erasable programmable read-only memory (EEPROM) and flash memory;

timing sources including clocks, oscillators and phase-docked loops;

peripherals including counter-timers, real-time timers and power-on reset generators;

external interfaces, including industry standards such as universal serial bus (USB), FireWire, Ethernet, universal synchronous/asynchronous receiver/transmitter (USART), serial peripheral interface (SPI);

analog interfaces including analog-to-digital converters (ADCs) and digital-to-analog converters (DACs); and voltage regulators and power management circuits.

A SoC includes both the hardware, described above, and software controlling the microcontroller, microprocessor and/or DSP cores, peripherals and interfaces. Most SoCs are developed from pre-qualified hardware blocks for the hardware elements (e.g., referred to as modules or components which represent an IP core or IP block), together with software drivers that control their operation. The above listing of hardware elements is not exhaustive. A SoC may include protocol stacks that drive industry-standard interfaces like a universal serial bus (USB).

Once the overall architecture of the SoC has been defined, individual hardware elements may be described in an abstract language called RTL which stands for registertransfer level. RTL is used to define the circuit behavior. Hardware elements are connected together in the same RTL language to create the full SoC design. In digital circuit design, RTL is a design abstraction which models a synchronous digital circuit in terms of the flow of digital signals (data) between hardware registers, and the logical operations performed on those signals. RTL abstraction is used in hardware description languages (HDLs) like Verilog and VHDL to create high-level representations of a circuit, from which lower-level representations and ultimately actual wiring can be derived. Design at the RTL level is typical practice in modern digital design. Verilog is standardized as Institute of Electrical and Electronic Engineers (IEEE) 1364 and is an HDL used to model electronic systems. Verilog is most commonly used in the design and verification of digital circuits at the RTL level of abstraction. Verilog may also be used in the verification of analog circuits and mixed-signal circuits, as well as in the design of genetic circuits. In some implementations, some or all of the components of computer system 1200 are implemented on a printed circuit board (PCB). One or more features of system 1200 may be implemented within the systems and processors described with respect to FIG. 11.

Figure 13:
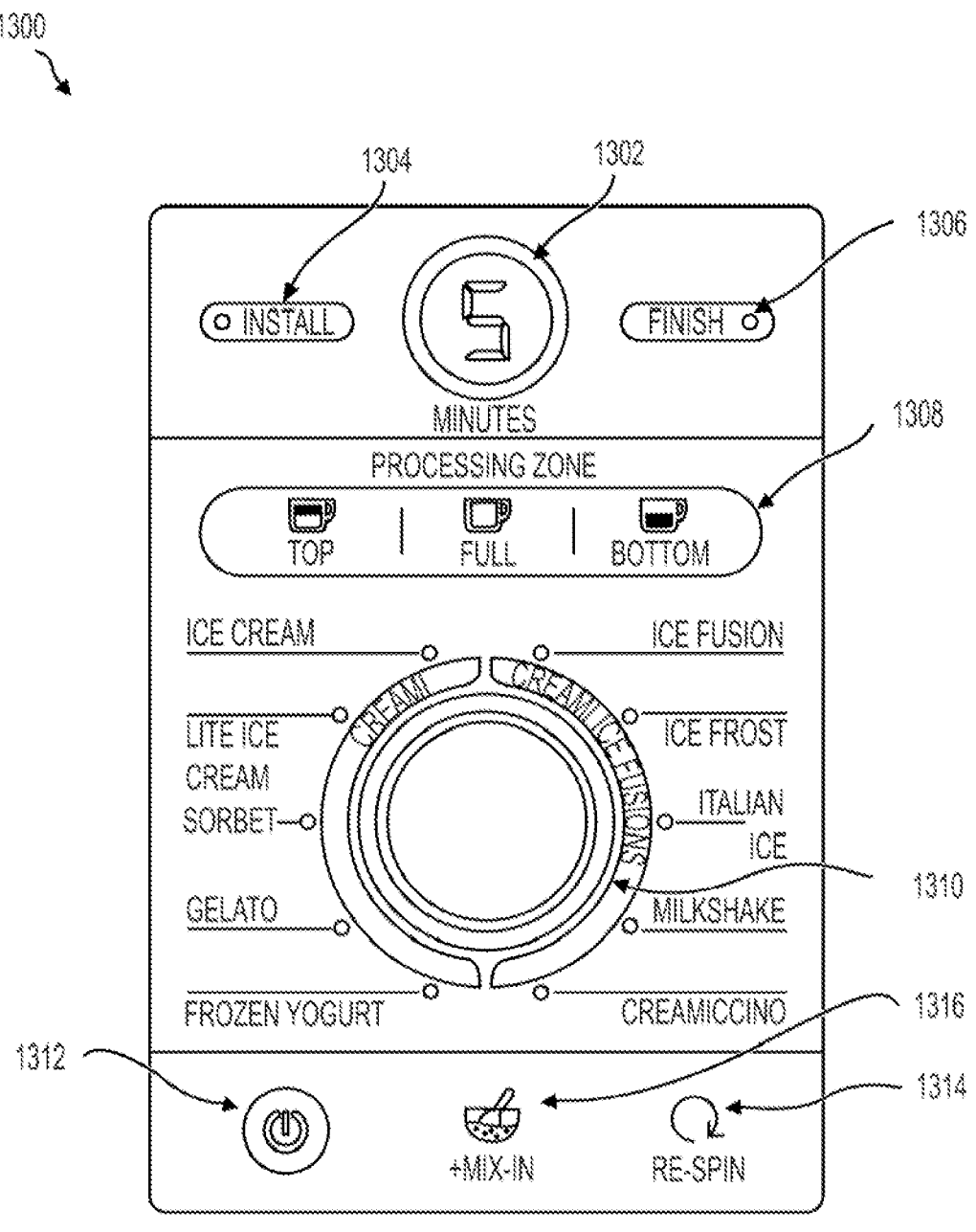
FIG. 13 shows a view of a user interface of the micro puree machine.

FIG. 13 shows a view of a user interface 1300 of the micro puree machine and/or food processor device 10. User interface 1300 includes a progress and/or status indicator 1302, a vessel and/or container install indicator 1304, a finished indicator 1306, a processing zone selector and/or indicator 1308; a food processing routine selector dial or wheel 1310, and power switch and/or indicator 1312, a mix-in indicator 1314, and a re-spin switch 1316. Progress indicator 1302 may include a number associated with a phase of operation of a routine that is running. In some implementations, the number corresponds approximately to a minute of time. In other implementations, other time periods may be used. For example, FIG. 13 shows the number "5" that indicates that the running routine is in the fifth phase and/or time period of operation. As the routine continues to run, the number will progressively decrease to 4, 3, 2, 1, and 0 until the routine is finished, which may be indicated via an illuminated light at finished indicator 1306. User interface 1300 may include a mylar panel with tactile switches and dial and/or wheel. Progress indicator 1302 may be in a different form such as a progress bar including multiple lights that sequentially turn off as a food processing routine runs from start to finish. As the routine runs, the number of lights illuminating progressive turn off until no lights are one when the routine is finished.

The zone indicator and/or selector 1308 may include multiple zones such as a full zone, top zone, and bottom zone. The full zone may be associated with a full volume of a container holding the first food type such that controller 1102 extends drive shaft 250 and blade assembly 300 fully into the container and processes the food type in both the top and bottom portions of the container. Zone indicator and/or selector 1308 may also include a top zone of the volume of the container and a bottom zone associated with a bottom portion of the volume of the container. When the top zone is selected, controller 1102 receives the selection and controls position motor 1112 such that only a portion of the food in the top zone of the container is processed. When the bottom zone is selected, controller 1102 receives the selection and controls position motor 1112 such that only a portion of the food in the bottom zone of the container is processed.

Food processing routine selector dial or wheel 1310 enables a user to select a routine and recipe from multiple routines. The routines may be associated with various food types such as, without limitation, ice cream, lite ice cream, sorbet, gelato, frozen yogurt, ice fusion, ice frost, Italian ice, milkshake, and creamiccino. Each routine may include a plurality of phases. However, the number of phases may be different between different routines based on the different food types being processed. Each phase may correspond to a time period. As previous noted, each time period may be about 60 seconds long, but other time periods may be used, and the length of time periods may vary among different phases of a particular routine as illustrated in Tables 1400 and 1500 of FIGS. 14 and 15 respectively. But, in some implementations, at least two phases have the same time period.

Power button and/or indicator 1312 may be used by a user to initiate a food processing routine. Power button 1312 may include a light that is solid to indicate that a process is running. Power button 1312 may flash on and off repeatedly to indicator a system fault or that the system is not ready to start a routine. Install indicator 1304 may flash on and off repeatedly to indicator that the vessel and/or container has not been installed for food processing. Mix-in selector and/or indicator 1314 may enable a user to add ingredients to any food type and have controller 1102 initiate a mix-in routine to mix the ingredients the vessel. Re-spin button and/or selector 1316 may be used by a user to initiate a re-spin routine regardless of food type to further process the food in the vessel.

Figure 14:
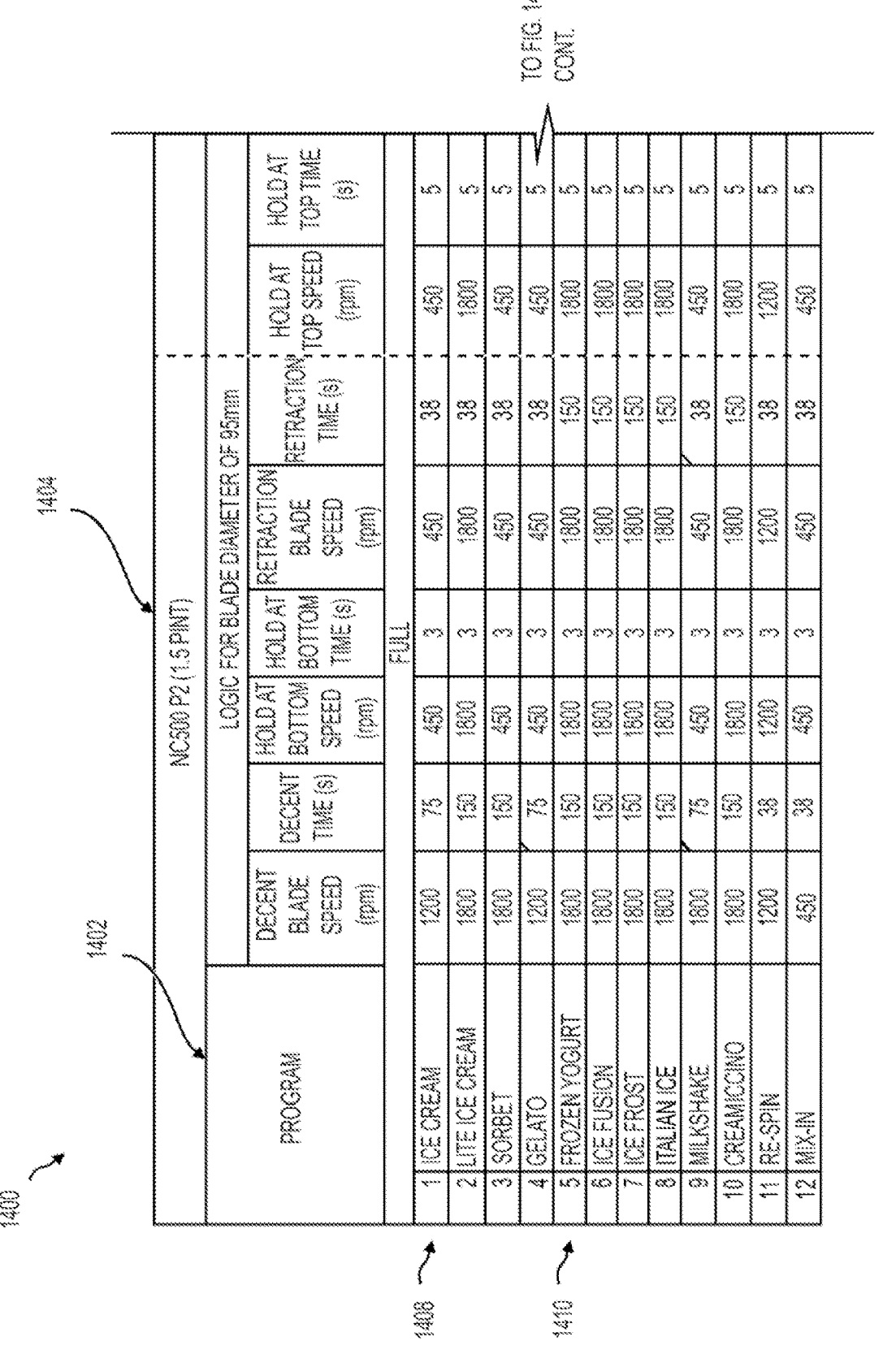
FIG. 14 includes a table of various food processing routines associated with various food types associated with processing a food type in all zones of a container.

FIG. 14 includes a table 1400 of various food processing routines in column 1402 associated with various food types when processing in all zones of a vessel and/or container, e.g., bowl assembly 350. Column 1402 includes a list of ten routines associated with food types from ice cream to creamiccino along with a re-spin routine and a mix-in routine. Section 1404 includes configuration data for controller 1102 to control operations such as drive motor 1110 and/or drive shaft 250 rotation speed, position motor 1112 rotation speed and direction of rotation, and position motor 1112 activation and deactivation. Section 1406 includes phase time periods associated with each routine and display logic for progress indicator 1102.

For example, row 1408 includes configuration data and phase time period data associated with processing an ice cream food type. Row 1408 of section 1404 includes the configuration data used by controller 1102 to run the food processing routine for ice cream. Configuration data parameters may include: decent blade speed of 1200 rpm, decent time of 75 seconds, Hold at boom speed of 450 rpm, hold at bottom time of 3 seconds, retraction blade speed of 450 rpm, retraction time of 38 seconds, hold at the top at 450 rpm, and hold at the top for 5 seconds. Row 1408 of section 1406 shows the overall timing and two phases associated with processing the ice cream food type. Because the total time of the routine is 121 seconds, there are only two phases of 60 seconds and 61 seconds, i.e., about 1 minute each. Progress indicator 1302 will therefore display a "2" during the first 60 seconds (e.g., first phase) and display a "1" during the next 61 seconds (e.g., second phase). Progress indicator 1302 will then display a "0" for five second when the ice cream processing routine is finished. Table 1400 may be stored in data store 1104.

As another example, row 1410 includes configuration data and phase time period data associated with processing a frozen yogurt food type. Row 1410 of section 1404 includes the configuration data used by controller 1102 to run the food processing routine for frozen yogurt. Configuration data parameters may include: decent blade speed of 1800 rpm, decent time of 150 seconds, hold at boom speed of 1800 rpm, hold at bottom time of 3 seconds, retraction blade speed of 1800 rpm, retraction time of 150 seconds, hold at the top at 1800 rpm, and hold at the top for 5 seconds. Row 1410 of section 1406 shows the overall timing and five phases associated with processing the frozen yogurt food type. Because the total time of the routine is 309 seconds, there are five phases of 62, 62, 62, 62, and 61 seconds, i.e., about 1 minute each. Progress indicator 1302 will therefore display a "5" during the first 62 second phase, display a "4" during a second 62 second phase, display a "3" during a third 62 second phase, display a "2" during a fourth 62 second phase, and display a "1" during a last 61 second phase. Progress indicator 1302 will then display a "0" for five second when the ice cream processing routine is finished. Hence, each row of Table 1400 includes configuration data used by controller 1102 to control operations accordingly for a food processing routine of a particular food type. As previous noted, the configuration data may be based on the size of the blade and/or blade assembly. The configuration data of Table 1500 is based on a blade size of 95 mm. Data store 1104 may include multiple tables of food processor routines like Table 1500, but with different configuration data base on the size of the blade and/or blade assembly.

Figure 15:
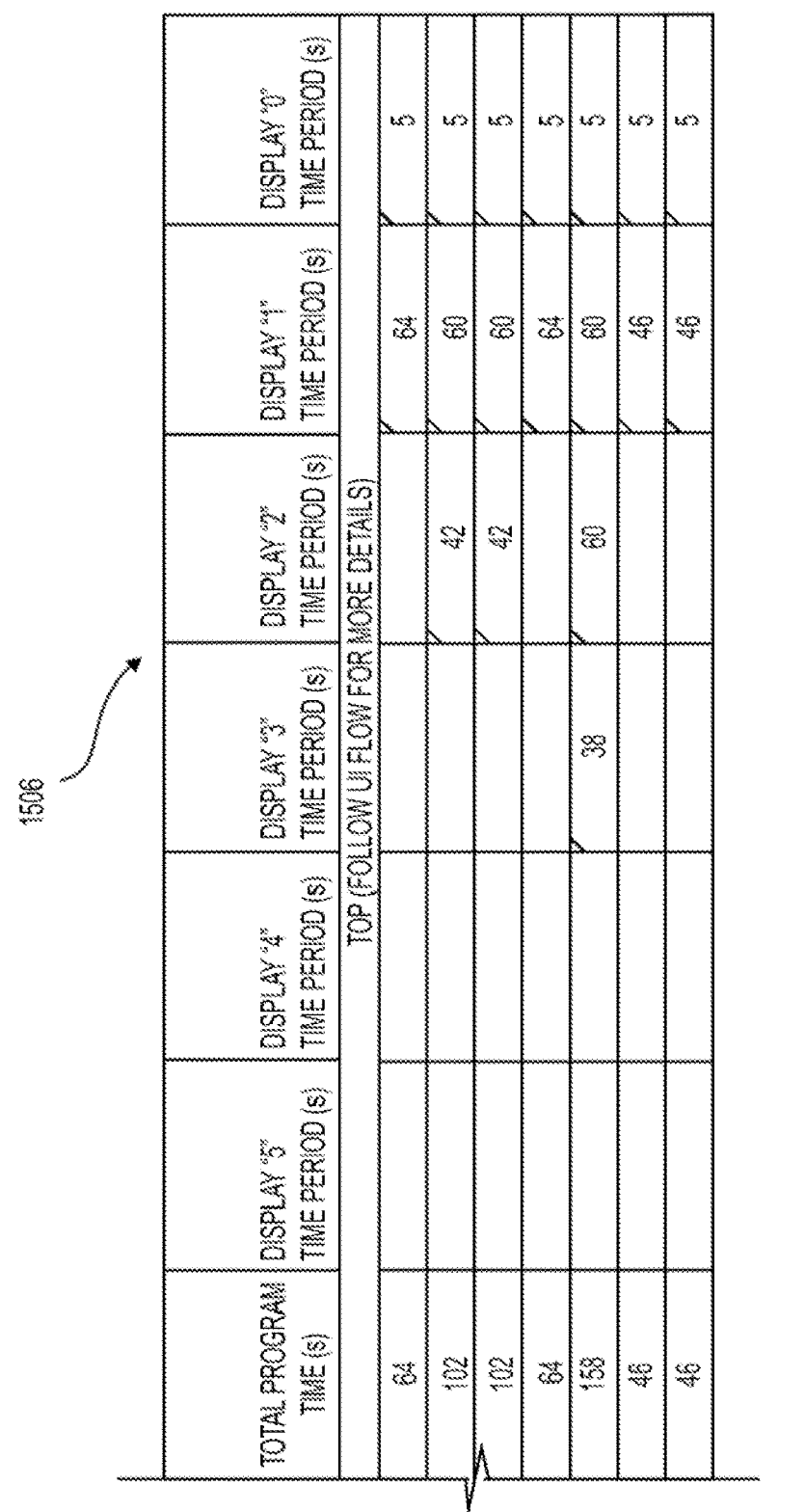
FIG. 15 includes a table of various food processing routines associated with various food types associated with processing a food type in the top zone of a container.

FIG. 15 shows a table 1500 of various food processing routines in column 1502 associated with various food types when processing a food type in the top zone of a container. Column 1502 includes a list of five routines associated with food types from ice cream to frozen yogurt along with a re-spin routine and a mix-in routine. Section 1504 includes configuration data for controller 1102 to control operations such as drive motor 1110 and/or drive shaft 250 rotation speed, position motor 1112 rotation speed and direction of rotation, and position motor 1112 activation and deactivation, when top zone processing has been designated. Section 1506 includes phase time periods associated with each routine. Similar to Table 1400, Table 1500 includes configuration data for each food type in each row associated with that food type.

FIG. 16 shows a process 1600 for manufacturing a motor controller for micro puree and/or food processor device 10 arranged to perform various food processing routines such as described in Tables 1400 and 1500 of FIGS. 14 and 15. Process 1600 may include mounting in or on a housing 100 and/or 140 of a micro puree device 10 and/or food processor device at least the following:

a drive motor 244 coupled to a drive shaft 250 via at least one gear, the drive motor 244 arranged to rotate a drive shaft 250 and blade assembly 300 attached thereto, a speed of rotation of the drive motor 244 corresponding to a speed of rotation of the drive shaft 250;

a position motor 260 operable to change a position of the drive shaft 250 via rotation of the position motor 260, a speed of rotation of the position motor 260 corresponding to a rate of change of position of the drive shaft 250;

a user interface 1300 arranged to: i) receive a user input to select a first routine associated with processing a first food type of a plurality of routines associated with processing a plurality of food types, and ii) display a status of the processing of the first food type while the first routine is running;

a data store 1104 arranged to store a database including configuration data associated with the plurality of routines, e.g., the configuration data shown in Tables 1400 and 1500; and a controller 1102 arranged to: i) receive the user input selecting the first routine and retrieve the configuration data associated with the first routine from the data store 1104, ii) control operations of the drive motor 244 based on the configuration data associated with the first routine, and iii) control operations of the position motor 260 based on the configuration data associated with the first routine.

It will be apparent to those of ordinary skill in the art that certain aspects involved in the operation of controller 1102 and/or computer system 1200 may be embodied in a computer program product that includes a computer usable and/or readable medium. For example, such a computer usable medium may consist of a read only memory device, such as a CD ROM disk or conventional ROM devices, or a random access memory, such as a hard drive device or a computer diskette, or flash memory device having a computer readable program code stored thereon. While the disclosure particularly shows and describes preferred implementations, those skilled in the art will understand that various changes in form and details may exist without departing from the present application as defined by the appended claims. The scope of this present application intends to cover such variations.

What is claimed is:

1. A micro puree machine comprising:
a drive motor coupled to a drive shaft via at least one drive gear, the drive motor arranged to rotate a drive shaft and blade assembly attached thereto, a speed of rotation of the drive motor corresponding to a speed of rotation of the drive shaft and a blade speed of the blade assembly;
a position motor operable to change a position of the drive shaft via rotation of the position motor, a speed of rotation of the position motor corresponding to a rate of change of position of the drive shaft;
a user interface arranged to receive a user input to select a first routine associated with processing a first food type of a plurality of routines associated with processing a plurality of food types;
a data store arranged to store a database including configuration data associated with the plurality of routines; and
a controller configured to: i) receive the user input selecting the first routine and retrieve the configuration data associated with the first routine from the data store, ii) control operations of the drive motor based on the configuration data associated with the first routine, and iii) control operations of the position motor based on the configuration data associated with the first routine, wherein the blade speed during descent of the blade assembly is different than the blade speed during retraction of the blade assembly while both the drive motor and position motor are activated.

2. The micro puree machine of claim 1, wherein controlling operations of the drive motor includes controlling at least one of activation, deactivation, a direction of rotation, and a speed of rotation of the drive motor.

3. The micro puree machine of claim 1, wherein controlling operations of the position motor includes controlling at least one of activation, deactivation, a direction of rotation, and a speed of rotation of the position motor.

4. The micro puree machine of claim 1, wherein the controller is further arranged to receiving timing data from a timer, the controller controlling operations of the drive motor and the position motor based on the configuration data and the timing data.

5. The micro puree machine of claim 4, wherein the timer includes a clock operated by a processor associated with the controller.

6. The micro puree machine of claim 1, wherein the configuration data includes a first zone designation of a plurality of zone designations.

7. The micro puree machine of claim 6, wherein the first zone designation is associated with a full volume of a container holding the first food type.

8. The micro puree machine of claim 7, wherein a second zone designation is associated with a top portion of the volume of the container and a third zone designation is associated with a bottom portion of the volume of the container.

9. The micro puree machine of claim 1, wherein the user interface is configured to either receive a user selection of one of a plurality of zones associated with different portions of a container volume holding the first food type or display a status of the processing of the first food type while the first routine is running.

10. The micro puree machine of claim 1, wherein a routine includes a plurality of phases.

11. The micro puree machine of claim 10, wherein the number of phases is different between the first routine and a second routine.

12. The micro puree machine of claim 10, wherein each phase corresponds to a time period.

13. The micro puree machine of claim 12, wherein the time period of at least two phases is the same.

14. The micro puree machine of claim 9, wherein the user interface displays the status of processing of the first food type while the first routine is running by displaying a number associated with each phase of operations of the routine.

15. The micro puree machine of claim 14, wherein the value of the number decreases as the routine enters each phase sequentially in time until the routine ends.

16. A food processor device motor control system comprising:
a drive motor coupled to a drive shaft via at least one gear, the drive motor arranged to rotate a drive shaft and blade assembly attached thereto, a speed of rotation of the drive motor corresponding to a speed of rotation of the drive shaft and a blade speed of the blade assembly;
a position motor operable to change a position of the drive shaft via rotation of the position motor, a speed of rotation of the position motor corresponding to a rate of change of position of the drive shaft;
a user interface arranged to receive a user input to select a first routine associated with processing a first food type of a plurality of routines associated with processing a plurality of food types;
a data store arranged to store a database including configuration data associated with the plurality of routines; and
a controller configured to: i) receive the user input selecting the first routine and retrieve the configuration data associated with the first routine from the data store, ii) control operations of the drive motor based on the configuration data associated with the first routine, and iii) control operations of the position motor based on the configuration data associated with the first routine, wherein the blade speed during descent of the blade assembly is different than the blade speed during retraction of the blade assembly while both the drive motor and the position motor are activated.

17. The micro puree machine of claim 16, where controlling operations of the drive motor includes controlling at least one of activation, deactivation, a direction of rotation, and a speed of the drive motor.

18. The micro puree machine of claim 16, wherein controlling operations of the position motor includes controlling at least one of activation, deactivation, a direction of rotation, and a speed of the position motor.

19. The micro puree machine of claim 16, wherein the controller is further arranged to receiving timing data from a timer, the controller controlling operations of the drive motor and the position motor based on the configuration data and the timing data.

20. A method for manufacturing a motor controller of a food processor device comprising:

mounting in or on a housing of the food processor at least the following:

a drive motor coupled to a drive shaft via at least one gear, the drive motor arranged to rotate a drive shaft and blade assembly attached thereto, a speed of rotation of the drive motor corresponding to a speed of rotation of the drive shaft and a blade speed of the blade assembly;

a position motor operable to change a position of the drive shaft via rotation of the position motor, a speed of rotation of the position motor corresponding to a rate of change of position of the drive shaft;

a user interface arranged to receive a user input to select a first routine associated with processing a first food type of a plurality of routines associated with processing a plurality of food types;

a data store arranged to store a database including configuration data associated with the plurality of routines; and a controller arranged to: i) receive the user input selecting the first routine and retrieve the configuration data associated with the first routine from the data store, ii) control operations of the drive motor based on the configuration data associated with the first routine, and iii) control operations of the position motor based on the configuration data associated with the first routine, wherein the blade speed during descent of the blade assembly is different than the blade speed during retraction of the blade assembly while both the drive motor and the position motor are activated.

\* \* \* \* \*